US012316408B2

(12) United States Patent
Shen et al.

(10) Patent No.: US 12,316,408 B2
(45) Date of Patent: May 27, 2025

(54) BEAM DETERMINATION METHOD, APPARATUS, ELECTRONIC DEVICE AND COMPUTER READABLE STORAGE MEDIUM

(71) Applicant: Samsung Electronics Co., Ltd., Suwon-si (KR)

(72) Inventors: Songhui Shen, Beijing (CN); He Wang, Beijing (CN); Yiyan Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 459 days.

(21) Appl. No.: 17/843,400

(22) Filed: Jun. 17, 2022

(65) Prior Publication Data

US 2022/0385342 A1 Dec. 1, 2022

Related U.S. Application Data

(63) Continuation of application No. PCT/KR2022/007220, filed on May 20, 2022.

(30) Foreign Application Priority Data

May 24, 2021 (CN) .......................... 202110565942.4

(51) Int. Cl.
*H04B 7/0452* (2017.01)
*H04W 52/02* (2009.01)

(52) U.S. Cl.
CPC ....... *H04B 7/0452* (2013.01); *H04W 52/0225* (2013.01)

(58) Field of Classification Search
CPC .................. H04B 7/0452; H04W 52/0225
See application file for complete search history.

(56) References Cited

U.S. PATENT DOCUMENTS 9,900,891 B1 * 2/2018 Islam ................... H04B 7/0695
9,960,830 B2 5/2018 Yoo et al.
(Continued)

FOREIGN PATENT DOCUMENTS

WO 2020/159430 A1 8/2020
WO 2020/159597 A1 8/2020
WO 2020/263925 A1 12/2020

OTHER PUBLICATIONS

International Search Report and Written Opinion dated Aug. 24, 2022, issued in International Patent Application No. PCT/KR2022/007220.

*Primary Examiner* — Brian P Cox
(74) *Attorney, Agent, or Firm* — Jefferson IP Law, LLP

(57) ABSTRACT

A beam determination method, apparatus, electronic device, and computer-readable storage medium are provided. The method includes determining at least one to-be-measured narrow beam among narrow beams corresponding to at least one wide beam, acquiring received signal strength of reference signals transmitted through at least one to-be-measured narrow beam, and predicting a target narrow beam for transmitting data based on the received signal strength. In the process of determining the target narrow beam of the disclosure, user equipment (UE) only needs to measure the Reference Signal Received Power (RSRP) of a part of the narrow beams used in the system, thereby reducing the occupation of measurement resources, reducing the measurement burden of the UE, and reducing the power consumption of the UE.

18 Claims, 18 Drawing Sheets

(56) References Cited

U.S. PATENT DOCUMENTS

| | | |
|---|---|---|
| 10,531,311 B2 | 1/2020 | Huang et al. |
| 10,616,896 B2 | 4/2020 | Kundargi et al. |
| 11,357,010 B2 | 6/2022 | Zhu et al. |
| 2019/0222275 A1 | 7/2019 | Mo et al. |
| 2019/0238202 A1 | 8/2019 | Chavva et al. |
| 2020/0136709 A1 | 4/2020 | Wang et al. |
| 2020/0169311 A1 | 5/2020 | Ottersten et al. |
| 2020/0358514 A1 | 11/2020 | Landis et al. |
| 2021/0014748 A1 | 1/2021 | Peitzer et al. |
| 2021/0036760 A1 | 2/2021 | Kim et al. |
| 2021/0058131 A1 | 2/2021 | Zhu et al. |
| 2021/0067978 A1 | 3/2021 | Cheraghi et al. |
| 2021/0160704 A1* | 5/2021 | Aksu .................. H04W 4/025 |
| 2022/0060240 A1 | 2/2022 | Xia et al. |
| 2022/0303843 A1* | 9/2022 | Yajnanarayana ........................ H04W 36/0033 |

\* cited by examiner

FIG. 9A

Data Format

| | |
|---|---|
| $WRSRP_{1,i-1}$ | $WRSRP_{1,i}$ |
| $WRSRP_{2,i-1}$ | $WRSRP_{2,i}$ |
| $WRSRP_{3,i-1}$ | $WRSRP_{3,i}$ |
| $WRSRP_{4,i-1}$ | $WRSRP_{4,i}$ |
| $NRSRP_{1,i-1}$ | $NRSRP_{1,i}$ |
| $NRSRP_{2,i-1}$ | $NRSRP_{2,i}$ |
| $NRSRP_{3,i-1}$ | $NRSRP_{3,i}$ |
| ... | ... |
| $NRSRP_{N2,i-1}$ | $NRSRP_{N2,i-1}$ |

BEAM DETERMINATION METHOD, APPARATUS, ELECTRONIC DEVICE AND COMPUTER READABLE STORAGE MEDIUM

CROSS-REFERENCE TO RELATED APPLICATION(S)

This application is a continuation application, claiming priority under § 365(c), of an International application No. PCT/KR2022/007220, filed on May 20, 2022, which is based on and claims the benefit of a Chinese patent application number 202110565942.4, filed on May 24, 2021, in the Chinese Intellectual Property Office, the disclosure of which is incorporated by reference herein in its entirety.

TECHNICAL FIELD

The disclosure relates to the field of communication technology. More particularly, the disclosure relates to a beam determination method, apparatus, electronic device, and computer-readable storage medium.

BACKGROUND

With the increasing demand for wireless data services, the bandwidth used by the mobile communication system is increasing, and the frequency band is also getting higher and higher. In the fifth-generation mobile communication system $5^{th}$ generation (5G), which is currently in the commercial development stage, the millimeter wave (mmWave) frequency band with richer frequency resources will be used. However, the higher the frequency, the greater the path loss of signal transmission. In order to overcome the great path loss caused by high frequency, the 5G system will use multiple-input and multiple-output (Massive MIMO) to enhance the quality of the transmission signal, thereby increasing the data transmission rate.

Massive MIMO technology uses a multi-antenna array for beamforming to form a narrow beam with high gain and high directivity in a three-dimensional space. However, since the three-dimensional spatial range that a single narrow beam can cover is very limited, Massive MIMO will generate multiple narrow beams to increase the spatial coverage, to ensure that there is a suitable beam in each direction to generate a larger signal gain. In addition, since the antenna array arrangement needs to occupy a certain space and has a certain implementation complexity, it is easier to implement the Massive MIMO technology on the base station (BS) side than on the terminal side or user equipment (UE) side.

Due to the mobility of the terminal, or the presence of obstacles between the base station and the terminal, the optimal beam on the base station side may change. If the optimal beam is not reselected and switched in time, it is very likely that the quality of transmission signal of currently used beam is degraded or even the link is interrupted. Therefore, the base station needs to detect the deterioration of the beam transmission quality in time, and find other better beams and perform beam switching through a certain method to reduce the possibility of link interruption.

At present, when the base station determines a better beam for beam switching, the UE needs to measure a large number of reference signals, which will consume a large amount of measurement resources and also bring excessive power consumption to the UE. Therefore, it is necessary to improve the existing beam determination method.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to solve at least one of the above-mentioned technical defects.

Additional aspects will be set forth in part in the description which follows and, in part, will be apparent from the description, or may be learned by practice of the presented embodiments.

In accordance with an aspect of the disclosure, a method for determining beam is provided. The method includes determining at least one to-be-measured narrow beam among narrow beams corresponding to at least one wide beam, acquiring received signal strength of reference signals transmitted through at least one to-be-measured narrow beam, and predicting a target narrow beam for transmitting data based on the received signal strength.

In an optional embodiment of the disclosure, the determining at least one to-be-measured narrow beam among narrow beams corresponding to at least one wide beam includes acquiring at least one candidate to-be-measured narrow beam corresponding to each of the at least one wide beam, and determining the at least one to-be-measured narrow beam among the at least one candidate to-be-measured narrow beam corresponding to each of the at least one wide beam, based on received signal strength of reference signals transmitted through the at least one wide beam.

In an optional embodiment of the disclosure, the acquiring at least one candidate to-be-measured narrow beam corresponding to each of the at least one wide beam includes determining the at least one candidate to-be-measured narrow beam, based on spatial distribution information of narrow beams covered by each of the at least one wide beam.

In an optional embodiment of the disclosure, the determining the at least one candidate to-be-measured narrow beam, based on spatial distribution information of narrow beams covered by each of the at least one wide beam includes determining at least one first narrow beam group including a first predefined number narrow beams, among the narrow beams covered by each of the at least one wide beam, acquiring a region area covered by each of the at least one first narrow beam group, based on the spatial distribution information of narrow beams in each of the at least one first narrow beam group, and determining a first predefined number narrow beams in a first narrow beam group which covers the largest region area, as the at least one candidate to-be-measured narrow beam.

In an optional embodiment of the disclosure, the acquiring at least one candidate to-be-measured narrow beam corresponding to each of the at least one wide beam includes determining the at least one candidate to-be-measured narrow beam, based on usage rate of narrow beams covered by each of the at least one wide beam.

In an optional embodiment of the disclosure, the determining the at least one candidate to-be-measured narrow beam, based on usage rate of narrow beams covered by each of the at least one wide beam includes determining a first predefined number narrow beams with the maximum usage rate among the narrow beams covered by each of the at least one wide beam as the at least one candidate to-be-measured narrow beam.

In an optional embodiment of the disclosure, the usage rate of the narrow beams covered by each of the at least one wide beam is acquired through the following manners:
  acquiring the number of time slots transmitted through the narrow beams covered by each of the at least one wide beam in a first specified period, and acquiring an average usage rate of the narrow beams based on the number of time slots,
  acquiring a historical average usage rate of the narrow beams covered by each of the at least one wide beam, and
  acquiring the usage rate of the narrow beams covered by each of the at least one wide beam, based on the average usage rate and the historical average usage rate.

In an optional embodiment of the disclosure, the determining the at least one to-be-measured narrow beam among the at least one candidate to-be-measured narrow beam corresponding to each of the at least one wide beam, based on received signal strength of reference signals transmitted through the at least one wide beam, includes determining candidate to-be-measured narrow beams covered by a second predefined number of wide beams with the largest received signal strength as the at least one to-be-measured narrow beam, or determining the at least one to-be-measured narrow beam among candidate to-be-measured narrow beams covered by two wide beams with the largest received signal strength.

In an optional embodiment of the disclosure, the determining the at least one to-be-measured narrow beam among candidate to-be-measured narrow beams covered by two wide beams with the largest received signal strength, includes acquiring a first difference in received signal strength between the two wide beams with the largest received signal strength,
  if the first difference is greater than or equal to a first predefined threshold, determining candidate to-be-measured narrow beams covered by a wide beam with larger received signal strength among the two wide beams with the largest received signal strength, as the at least one to-be-measured narrow beam, and
  if the first difference is less than the first predefined threshold, determining a third predefined number of to-be-measured narrow beams among the candidate to-be-measured narrow beams covered by the wide beam with the larger received signal strength, and determining a fourth predefined number of to-be-measured narrow beams among candidate to-be-measured narrow beams covered by a wide beam with a lower received signal strength, among the two wide beams with the largest received signal strength.

In an optional embodiment of the disclosure, the determining a third predefined number of to-be-measured narrow beams among the candidate to-be-measured narrow beams covered by the wide beam with the larger received signal strength, and the determining a fourth predefined number of to-be-measured narrow beams among candidate to-be-measured narrow beams covered by a wide beam with a lower received signal strength, among the two wide beams with the largest received signal strength, includes determining at least one second narrow beam group among the candidate to-be-measured narrow beams covered by the wide beam with the larger received signal strength, wherein each of the at least one second narrow beam group includes a third predefined number of candidate to-be-measured narrow beams, determining at least one third narrow beam group among the candidate to-be-measured narrow beams covered by the wide beam with the lower received signal strength, wherein each of the at least one third narrow beam group includes a fourth predefined number of candidate to-be-measured narrow beams, and acquiring a second difference between a center direction of each of the at least one second narrow beam group and a center direction of each of the at least one third narrow beam group respectively, and determining candidate to-be-measured narrow beams in both second narrow beam group and third narrow beam group corresponding to the smallest second difference as the to-be-measured narrow beams.

In an optional embodiment of the disclosure, the second difference between the center direction of the second narrow beam group and the center direction of the third narrow beam group is acquired through the following manners:
  acquiring a vertical direction angle and a horizontal direction angle of candidate to-be-measured narrow beams in both the second narrow beam group and the third narrow beam group, and
  acquiring the second difference between the center direction of the second narrow beam group and the center direction of the third narrow beam group, based on the vertical direction angle and the horizontal direction angle of the candidate to-be-measured narrow beams.

In an optional embodiment of the disclosure, the third predefined number is equal to the fourth predefined number.

In an optional embodiment of the disclosure, the predicting a target narrow beam for transmitting data based on the received signal strength includes predicting a target narrow beam for transmitting data by using a prediction model based on the received signal strength.

In an optional embodiment of the disclosure, the prediction model includes at least two prediction sub-models, the method further includes acquiring movement state information of a user equipment (UE), wherein the movement state information indicates movement speed of the UE, and determining a prediction sub-model for predicting the target narrow beam among at least two prediction sub-models of the predefined prediction model, based on the movement state information,
  the predicting a target narrow beam for transmitting data by using a prediction model based on the received signal strength includes:
  predicting the target narrow beam for transmitting data by using the determined prediction sub-model based on the acquired received signal strength.

In an optional embodiment of the disclosure, if the determined prediction sub-model includes at least two prediction sub-models, each of which corresponds to a prediction moment, the predicting the target narrow beam for transmitting data by using the determined prediction sub-model based on the acquired received signal strength includes predicting the target narrow beam for corresponding prediction moment separately by using each of determined prediction sub-models based on the acquired received signal strength.

In an optional embodiment of the disclosure, the acquiring movement state information of a UE comprises: acquiring movement speed value of the UE or a switching times of activated beam of the UE in a second specified period.

In an optional embodiment of the disclosure, the predicting a target narrow beam for transmitting data by using a prediction model based on the received signal strength includes acquiring received signal strength of the reference signals transmitted through the at least one wide beam, acquiring historical received signal strength of the at least one wide beam and historical received signal strength of the at least one to-be-measured narrow beam, and predicting the target narrow beam, by using the prediction model, based on the historical received signal strength of the at least one wide beam and the historical received signal strength of the at least one to-be-measured narrow beam, and the received signal strength of the at least one wide beam and the received signal strength of the at least one to-be-measured narrow beam.

In accordance with another aspect of the disclosure, an apparatus for determining beam is provided. The apparatus includes a to-be-measured narrow beam determination module, configured to determine at least one to-be-measured narrow beam among narrow beams corresponding to at least one wide beam, a received signal strength acquisition module, configured to acquire received signal strength of reference signals transmitted through at least one to-be-measured narrow beam, and a target narrow beam prediction module, configured to predict a target narrow beam for transmitting data based on the received signal strength.

In accordance with another aspect of the disclosure, an electronic device is provided. The electronic device includes a memory and a processor, wherein the memory is configured to store a computer program, the processor is configured to execute the computer program to implement the method provided in the embodiment or any optional embodiment in the first aspect.

In accordance with another aspect of the disclosure, a computer readable storage medium is provided. The medium includes a computer program is stored thereon, and when executed by a processor, the computer program implements the method provided in the embodiment or any optional embodiment in the first aspect.

The technical solution of the disclosure has at least advantages below:

In the process of determining the target narrow beam, UE only needs to measure the received signal strength of the reference signals transmitted by a part of the narrow beams in the system, thereby reducing the occupation of measurement resources, reducing the measurement burden of the UE, and reducing the power consumption of the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9A is a schematic diagram of a data format composed of first RSRP values of wide beams and second RSRP values of to-be-measured narrow beams in according to an embodiment of the disclosure;

Throughout the drawings, like reference numerals will be understood to refer to like parts, components, and structures.

DETAILED DESCRIPTION

Figure 1:
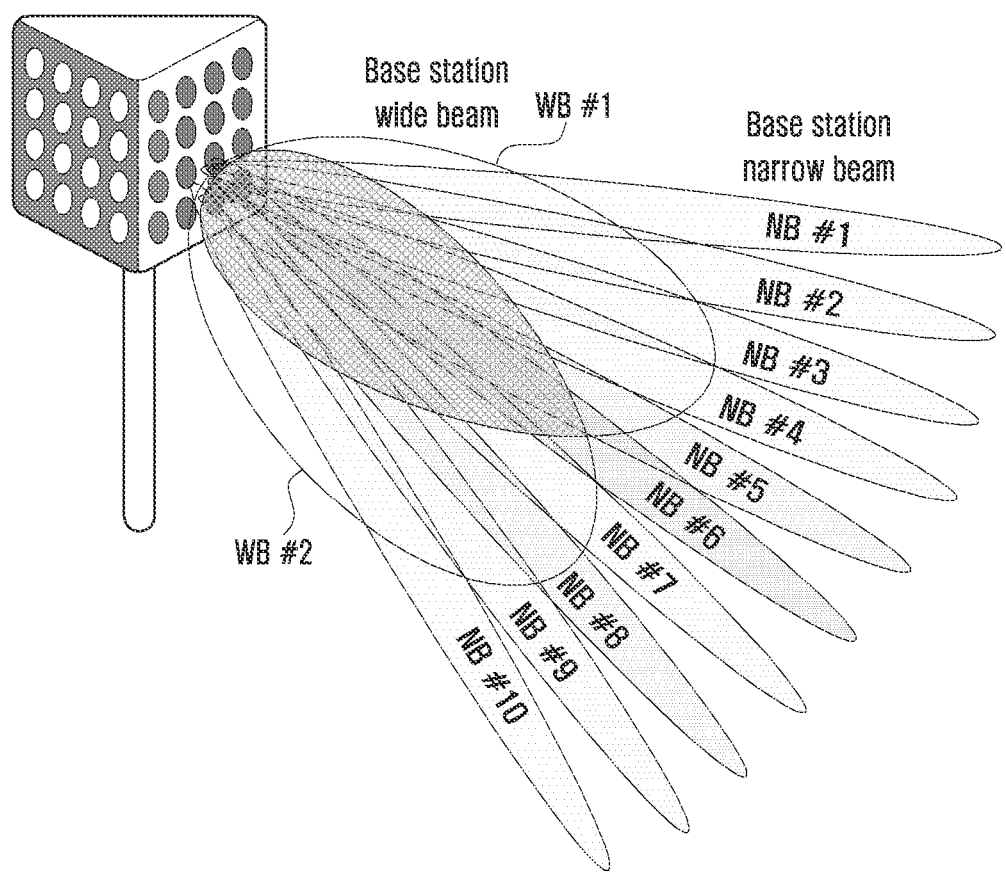
FIG. 1 is a schematic diagram of a hierarchical beam structure on the base station side according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood by those skill in the art that singular forms "a," "an," "the," and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

In order to make the purpose, technical solutions and advantages of the disclosure clearer, the following will further describe the embodiments of the disclosure in detail with reference to the accompanying drawings.

There are two main solutions for beam selection on the network side. One solution is a naïve full transmitting beam sweeping scheme, that is, the base station configures synchronization signal block (SS/PBCH block) (SSB) resources for each narrow beam to be transmitted, and triggers the terminal to measure Reference Signal Received Power (RSRP) for all configured SSB resources, and then the base station takes the narrow beam corresponding to the SSB sequence number with the largest RSRP value reported by the terminal as the optimal beam and uses it as the beam for data transmission at the next moment, where PBCH is a physical broadcast channel.

The other solution is a transmitting beam sweeping with a hierarchical beam structure, which combines wide beams (WBs) based on SSB resources and narrow beams (NBs) based on Channel State Information-Reference Signal (CSI-RS) resources.

FIG. 1 is a schematic diagram of a hierarchical beam structure used on the base station side according to an embodiment of the disclosure.

Referring to FIG. 1, WB #1 and WB #2 are two wide beams, and NB #1~ #10 are ten narrow beams. The wide beam has a wide beam width and a large spatial coverage, but a relatively small beam gain. The narrow beam has a large beam gain, but a narrow beam width and a small spatial coverage.

The basic process of transmitting beam sweeping with hierarchical beam structure includes: the base station first triggers the terminal to perform the wide-beam RSRP measurement on the SSB resource; then, when the optimal wide beam is acquired, all the narrow beams covered by the optimal wide beam are configured with the corresponding channel state information-reference signal (CSI-RS) resources to trigger the terminal to perform the narrow beam RSRP measurement; finally, the optimal narrow beam is selected according to the feedback narrow beam RSRP value as the beam for data transmission at the next moment.

However, both of the above two existing solutions have certain problems. In the naïve full transmitting beam sweeping scheme, the base station needs to configure a large number of SSB resources for RSRP measurement. However, due to the very limited SSB resources (for example, there is one SSB burst every period of 20 ms, and one SSB burst contains up to 64 SSB resources), the SSB resources that can be used for other measurements are very scarce, or even not enough, when a large number of SSB resources are used for RSRP measurement; in addition, the terminal needs to measure RSRP values on a large number of SSB resources in a short time, which will cause a great measurement burden on the terminal, and will consume more battery power.

Similar problems also exist in the transmitting beam sweeping scheme with the hierarchical beam structure. On the one hand, it requires a lot of resource consumption. For the base station, it needs to occupy a large number of Resource Elements (REs) to transmit CSI-RS resources to perform narrow beam RSRP measurement; for the terminal, it needs to perform measurement on a large number of CSI-RS resources, thereby causing a great measurement burden, and will consume more battery power.

On the other hand, the base station can only select the optimal narrow beam from the narrow beams covered by the optimal wide beam. If the terminal moves fast, the terminal has moved outside of coverage of the optimal wide beam during the period of measurement and report by the terminal, then the base station cannot accurately determine the current optimal beam, which will cause the problem of low beam selection accuracy, and ultimately leads to the degradation of signal transmission quality and system throughput, or even link interruption.

In view of the foregoing problems, the embodiments of the disclosure provide a beam determination solution, and the solution will be described in detail below.

Figure 2A:
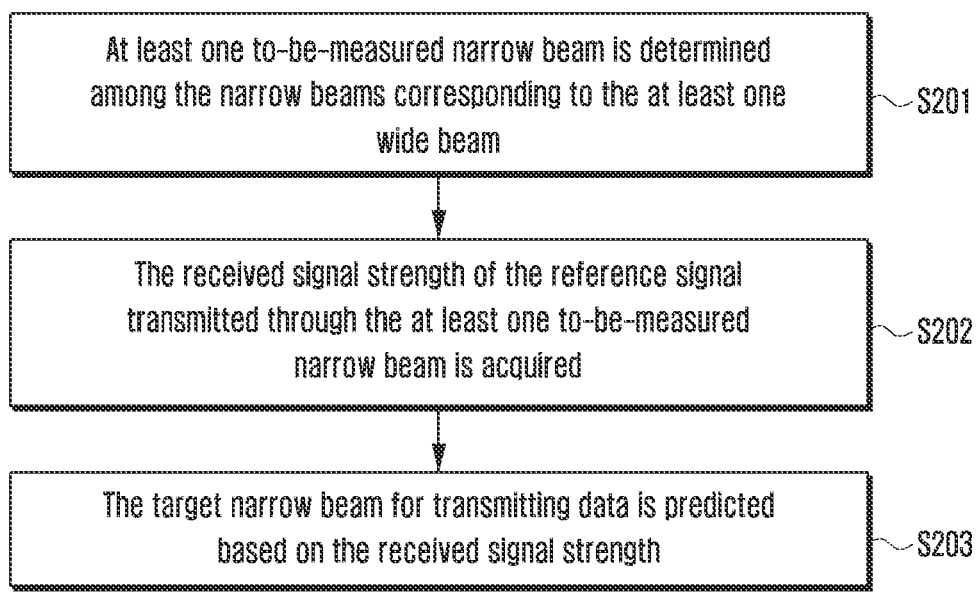
FIG. 2A is a schematic flowchart of a beam determination method provided according to an embodiment of the disclosure.

FIG. 2A is a schematic flowchart of a beam determination method provided according to an embodiment of the disclosure.

The execution subject of the solution may be a base station, such as a base station in a $5^{th}$ generation (5G) communication system or a $6^{th}$ generation (6G) communication system.

Referring to FIG. 2A, the method may include: operation S201: at least one to-be-measured narrow beam is determined among the narrow beams corresponding to the at least one wide beam; operation S202: the received signal strength of the reference signals transmitted through the at least one to-be-measured narrow beam is acquired; operation S203, the target narrow beam for transmitting data is predicted based on the received signal strength.

In the solution provided in the disclosure, in the process of determining the target narrow beam, the user equipment (UE) only needs to measure the received signal strength of the reference signals transmitted by a part of the narrow beams in the system, thereby reducing the occupation of measurement resources, reducing the measurement burden of UE and reducing the power consumption of the UE.

The operations of the solution are described in detail below. In an embodiment of the disclosure, a first RSRP value, measured by the UE based on the SSB resources configured by the base station, is used to represent the received signal strength of the reference signals transmitted through the wide beams, which is abbreviated as "wide-beam first RSRP value" hereinafter; a second RSRP value, measured by the UE based on the CSI-RS resources configured by the base station, is used to represent the received signal strength of the reference signals transmitted through the narrow beams, which is abbreviated as "narrow-beam second RSRP value" hereinafter. That is, the base station may acquire the signal strengths corresponding to the wide beam and the narrow beam through the first RSRP value and the second RSRP value fed back by the UE. It is understandable that the above two representations of received signal strength are only two example representations for illustrating the solution of the disclosure, and the disclosure is not limited thereto.

Figure 2B:
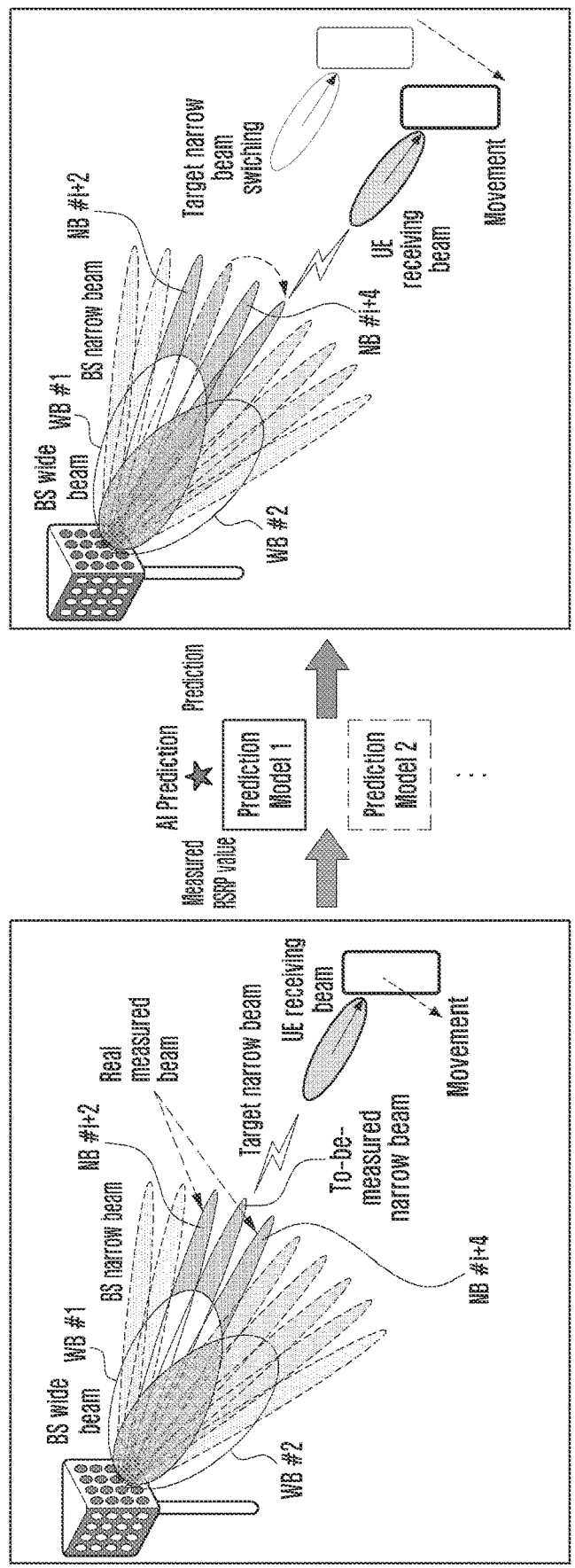
FIG. 2B is a schematic diagram of the overall implementation of the beam determination method provided according to an embodiment of the disclosure.

FIG. 2B further illustrates the beam determination process provided according to an embodiment of the disclosure.

Referring to FIG. 2B, the left frame shows that before the base station re-determines a target narrow beam, the base station and the UE perform data transmission through the previously determined target narrow beam. Before performing beam switching, the base station first determines the corresponding to-be-measured narrow beams from the candidate to-be-measured narrow beams of the base station, and measures the received signal strength of the reference signal transmitted through the to-be-measured narrow beams to obtain the RSRP value, and then uses an artificial intelligence (AI) prediction model to predict the target narrow beam for the prediction moment. Here, for fast-moving UEs, multiple AI-based prediction models may be used to predict the target narrow beam for multiple prediction moments. Finally, when a different prediction moment is reached, the base station will switch the target narrow beam, that is, switch from the narrow beam currently in use to the predicted target narrow beam.

In the beam determination solution provided in the disclosure, firstly at least one to-be-measured narrow beam is determined among narrow beams corresponding to at least one wide beam, and received signal strength of reference signals transmitted through at least one to-be-measured narrow beam is acquired.

The base station may re-determine the optimal narrow beam at intervals of time, and perform beamforming at the next moment based on the re-determined optimal narrow beam. In other words, the base station performs an operation of determining the optimal narrow beam at intervals of time. The current predefined period is the predefined time period before the time when the base station re-determines the optimal narrow beam. In the predefined period, the base station receives the first RSRP value of each of wide beams transmitted by the UE, and determines the to-be-measured narrow beams from the narrow beams covered by each of wide beams based on the first RSRP value of each of wide beams, and receives the second RSRP value of each of to-be-measured narrow beams transmitted by the UE. In addition, the predefined time period before the time when the base station determines the optimal narrow beam at this time is the previous predefined period. For example, after the base station determining the optimal narrow beam last time, in the corresponding previous predefined period, the base station receives the first RSRP value of each of wide beams transmitted by the UE, determines the to-be-measured narrow beams from the narrow beams covered by each of wide beams based on the first RSRP value of each of wide beams, and receives the second RSRP value of each of to-be-measured narrow beams transmitted by the UE. It is understandable that the range of the predefined period may be set according to actual needs.

The to-be-measured narrow beams are determined from the narrow beams covered by the wide beam, for which the UE requires to measure the RSRP value. That is, the process of determining the to-be-measured narrow beams is actually selecting a part of all the narrow beams covered by each of wide beams for the UE to measure the RSRP value. Compared with the related technology, since the number of narrow beams for which the UE requires to measure the RSRP value is reduced, the measurement resources needed to be configured by the base station may be reduced, which can effectively save the configuration overhead of CSI-RS resources, reduce the measurement burden of the terminal and reduce the battery consumption of the terminal.

Specifically, in the current predefined period, the base station determines the wide-beam measurement resources, and informs the UE to perform the corresponding wide-beam RSRP measurement and report. The specific method is that the base station reserves some time-frequency resources for each of wide beams for transmitting the corresponding SSB reference signal, and transmits the configuration information such as the time-frequency position and transmission period of the SSB resources to the UE through a radio resource control (RRC) message. At the same time, the base station will also transmit the list of SSB resources, the reporting period and other information that needs to be measured and reported to the UE through the RRC message. Then, when the reserved time is reached, the base station uses the corresponding wide beam at each reserved time-frequency resource location to perform SSB signal transmission, that is, performs the beamforming on SSB signal using a beambook corresponding to the wide beam. Correspondingly, after receiving the above configuration message, the UE will perform RSRP measurement on each of configured SSB resources to obtain the RSRP value of the corresponding wide beam, and report the measured wide-beam RSRP value to the base station. That is, the first RSRP value of each of wide beams is transmitted to the base station.

After determining the to-be-measured narrow beams, the base station generates a corresponding CSI-RS signal for each of to-be-measured narrow beams, performs beamforming on the CSI-RS signal using the beambook corresponding to the to-be-measured narrow beam, and transmits beamformed CSI-RS signal on the corresponding time-frequency resource; at the same time, the base station will also notify the UE of the CSI-RS resource list that needs to be measured and reported through a downlink control information (DCI) message. Correspondingly, after receiving the above configuration message, the UE may perform RSRP measurement on each of configured CSI-RS resources to obtain the RSRP value of the corresponding narrow beam, and report the measured narrow-beam RSRP value to the base station. The second RSRP value of each of to-be-measured narrow beams is transmitted to the base station.

The target narrow beam for transmitting data is predicated based on the received signal strength, and the beamforming is performed based on the target narrow beam.

The target narrow beam is the above-mentioned optimal narrow beam and is used for beamforming at the next moment, where the next moment is the time between the current predefined period and the next predefined period.

Specifically, based on the acquired multiple first RSRP values and multiple second RSRP values, the target beam is determined from all the narrow beams covered by each of wide beams based on these RSRP values, and the beamforming is performed based on the target narrow beam at the next moment.

Figure 2C:
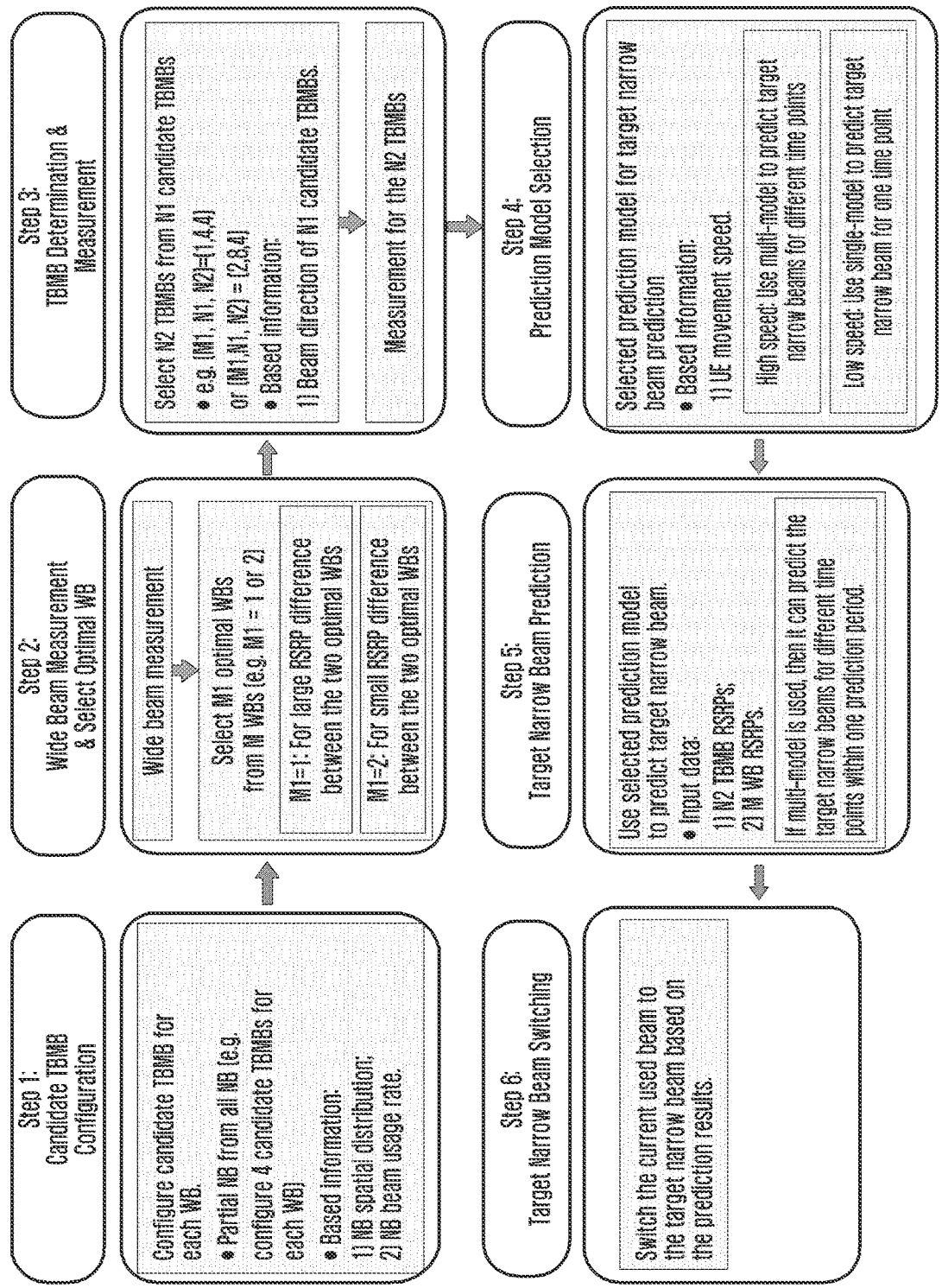
FIG. 2C is a schematic diagram of specific implementation operations of a beam determination method according to an embodiment of the disclosure.

FIG. 2C is a schematic diagram of specific implementation operations of a beam determination method according to an embodiment of the disclosure.

Referring to FIG. 2C, the beam determination method provided in the disclosure can be further subdivided into the following operations:

Operation 1: the base station configures corresponding candidate to-be-measured narrow beams (TBMB) for each of wide beams according to the spatial distribution information or usage rate of the narrow beams covered by the wide beam. For example, four candidate to-be-measured narrow beams may be configured for each of wide beams.

Operation 2: the RSRP value of each of wide beams is measured, and a certain number of wide beams is selected based on the RSRP value of the wide beam, for determining the to-be-measured narrow beams from the candidate to-be-measured narrow beams covered by the selected wide beams subsequently.

Operation 3: the to-be-measured narrow beam is determined from the candidate to-be-measured narrow beams covered by the selected wide beams, and the RSRP value of the to-be-measured narrow beam is measured.

Operation 4: a prediction model is determined according to movement speed of the UE. If the UE is in a high-speed moving state, a multi-model prediction scheme is selected, that is, the selected prediction model contains multiple prediction sub-models and each of prediction sub-models is used for predicting a target narrow beam for the corresponding time; if the UE is in a low-speed moving state, a single-model prediction scheme is selected, that is, the selected prediction model contains only one prediction sub-model.

Operation 5: the target narrow beam is predicted using the determined prediction scheme based on the determined RSRP value of the to-be-measured narrow beam and the RSRP values of all wide beams. If the multi-model prediction scheme is used, the target narrow beams for multiple prediction moments of a prediction period may be obtained.

Operation 6: the target narrow beam is switched, that is, the narrow beam for transmitting data between the base station and the UE is switched to the target narrow beam for the prediction moment.

In the solution of the disclosure, based on the first RSRP values of the multiple wide beams in the current predefined period, a part of to-be-measured narrow beams for UE performing RSRP measurement is determined from all the narrow beams. Then the target narrow beam is determined based on the first RSRP value of each of wide beams and the second RSRP value of each of to-be-measured narrow beams, and finally beamforming is performed based on the target narrow beam. In the process of determining the target narrow beam, UE only needs to measure the RSRP values of a part of the narrow beams in the system, thereby reducing the occupation of measurement resources, reducing the measurement burden of the UE, and reducing the power consumption of the UE.

In an optional embodiment of the, the determining at least one to-be-measured narrow beam among narrow beams corresponding to at least one wide beam comprises:

acquiring at least one candidate to-be-measured narrow beam corresponding to each of at least one wide beam; and determining the at least one to-be-measured narrow beam among at least one candidate to-be-measured narrow beam corresponding to each of at least one wide beam, based on received signal strength of reference signals transmitted through the at least one wide beam.

Specifically, a part of narrow beams may be selected as the candidate to-be-measured narrow beams from the multiple narrow beams covered by each of wide beams, that is, a corresponding candidate to-be-measured narrow beam set is determined for each of wide beams. Then, based on the first RSRP value of each of wide beams, multiple to-be-measured narrow beams are determined from the candidate to-be-measured narrow beam set. Here, the candidate to-be-measured narrow beam set corresponding to each of wide beams may be determined in real time before each time the target narrow beam is determined or may be predetermined, and it may be used directly each time the target narrow beam is determined.

Specifically, the method for determining candidate to-be-measured narrow beam set of each of wide beams may include: determining a corresponding candidate to-be-measured narrow beam set, based on spatial distribution information of the narrow beams covered by each of wide beams; or, determining a corresponding candidate to-be-measured narrow beam set based on the usage rate of narrow beams covered by each of wide beams. The two determination methods will be described in detail below.

It should be noted that the method for determining the candidate to-be-measured narrow beam set of each of wide beams is not limited to the above-mentioned two methods, and different determination methods may also be used according to the actual needs of the communication system.

In an optional embodiment of the disclosure, the determining the at least one candidate to-be-measured narrow beam, based on spatial distribution information of narrow beams covered by each of the at least one wide beam comprises:

determining at least one first narrow beam group including a first predefined number narrow beams, among the narrow beams covered by each of the at least one wide beam;

acquiring a region area covered by each of the at least one first narrow beam group, based on the spatial distribution information of narrow beams in each of the at least one first narrow beam group; and determining a first predefined number narrow beams in a first narrow beam group which covers the largest region area, as the at least one candidate to-be-measured narrow beam.

Figure 3:
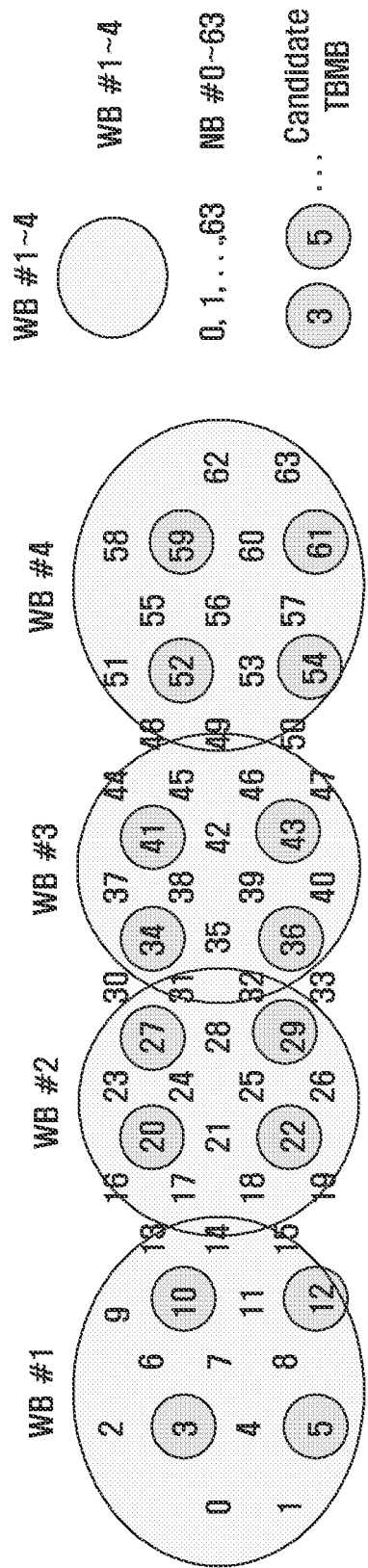
FIG. 3 is a schematic diagram of determining candidate to-be-measured narrow beams based on beam spatial distribution information in an example of according to an embodiment of the disclosure.

FIG. 3 is a schematic diagram of determining candidate to-be-measured narrow beams based on beam spatial distribution information in an example of according to an embodiment of the disclosure.

Referring to FIG. 3, it is a schematic diagram of determining candidate to-be-measured narrow beams based on beam spatial distribution information in an embodiment of the disclosure. Referring to FIG. 3, there are M=4 wide beams and N=64 narrow beams. The 4 wide beams are respectively denoted as WB #1, WB #2, WB #3 and WB #4, that is, the wide beams are numbered as #m (m=1, 2, 3, 4); the 64 narrow beams are denoted as numbers from 0 to 63, that is, the narrow beams are numbered as #n (n=0, 1, 2, . . . , 63), wherein the up, down, left, and right relationships of numbers indicate distribution of each of narrow beams in space. In the method of determining candidate to-be-measured narrow beams based on beam spatial distribution information, N1 (for example, N1=16) narrow beams (circled by "circles (o)" in the figure) need to be selected from N narrow beams as candidate to-be-measured narrow beams. The selected candidate to-be-measured narrow beams should be evenly dispersed in all directions in the entire coverage region as much as possible, so that the N1 narrow beams have as large a coverage area as possible. For example, in FIG. 3, under each of wide beams, K=N1/M=4 narrow beams are selected as evenly as possible to form 16 candidate to-be-measured narrow beams, that is, the narrow beams numbered as follows in the figure: 3, 5, 10, 12, 20, 22, 27, 29, 34, 36, 41, 43, 52, 54, 59, 61. The candidate to-be-measured narrow beams covered by the wide beam WB #1 are numbered as 3, 5, 10, 12, the candidate to-be-measured narrow beams covered by the wide beam WB #2 are numbered as 20, 22, 27, 29, and the candidate to-be-measured narrow beams covered by the wide beam WB #3 are numbered as 34, 36, 41, 43, and the candidate to-be-measured narrow beams covered by the wide beam WB #4 are numbered as 52, 54, 59, 61.

Further, the method for determining candidate to-be-measured narrow beams based on beam spatial distribution information may be specifically as follows: first, the spatial direction information (marked with a vertical direction angle θn and a horizontal direction angleφn, n=0,1,2, ..., N-1) of each of narrow beams is obtained, and the spatial direction information of the N narrow beams is drew in the θ-φ two-dimensional coordinate plane, and then in this two-dimensional coordinate plane, N1 narrow beams are selected from the spatial directions of the N narrow beams as evenly as possible, as candidate to-be-measured narrow beams.

It should be noted that the beams in the embodiments of the disclosure are all analog beams, which are related to the implementation of the antenna array forming the beam, the beam direction does not change frequently, and the spatial distribution of the beam is almost static. The selection rule based on the beam spatial distribution information is only related to the implementation of the base station, regardless of the influence of environmental factors around different base stations and the actual use of beams. Therefore, the method of determining the candidate to-be-measured narrow beams based on the beam spatial distribution information may be used as the default selection rule in an initialization phase of the system, that is, when the base station determines the target narrow beam for the first time.

In an optional embodiment of the disclosure, the determining the at least one candidate to-be-measured narrow beam, based on usage rate of narrow beams covered by each of the at least one wide beam comprises:

determining a first predefined number narrow beams with the maximum usage rate among the narrow beams covered by each of the at least one wide beam as the at least one candidate to-be-measured narrow beam.

Specifically, due to the influence of the environment near the base station, different narrow beams will produce different data transmission usage rates. For example, due to the influence of roads and buildings near the base station, the terminal moves along the road in most cases, and may be blocked by buildings in some regions. Therefore, the narrow beams toward the road have a higher usage rate, and the narrow beams that are away from the road and blocked by buildings have a lower usage rate.

The selection rule based on beam usage rate statistical information may be described by the following formula:

$$TBMBC_m = \{TBMBC_{m,k}\} = \arg K\max_{j}(R_{m,j})$$

$TBMBC_m$ is a candidate to-be-measured narrow beam set under the coverage of wide beam #m (m=1, 2, ..., M); $TBMBC_{m,k}$ is the kth (k=1, 2, ..., K) candidate to-be-measured narrow beam under the coverage of wide beam #m; $R_{m,j}$ is a beam usage rate of the jth narrow beam under the coverage of the wide beam #m;

$$\arg K\max_{j}(R_{m,j})$$

is a sequence number j corresponding to the largest K values being selected from the set $\{R_{m,j}, j=1,2, ...\}$, that is, the narrow beams corresponding to the largest K beam usage rates being selected from the set $\{R_{m,j}, j=1,2, ...\}$.

For each of wide beams #m, the average usage rate of each of narrow beams under its coverage needs to be calculated separately. The average beam usage rate of each of narrow beams for the current moment is obtained by the following manners: the base station calculates the beam usage rate in a first specified period by using the number of transmission time slots of each of narrow beams in the first specified period, and then combines the beam usage rate in this period with the historical average beam usage rate to obtain the beam usage rate for the current moment. It should be noted that the beam usage rate of each of narrow beams may be updated periodically according to the above-mentioned manner That is, at intervals of time, the beam usage rate of each of narrow beams is obtained in the above-mentioned manner, and the latest beam usage rate may be used when determining the candidate to-be-measured narrow beams. It is understandable that the currently determined usage rate of the narrow beam will be used as the historical average beam usage rate when determining the candidate to-be-measured narrow beams next time.

In an optional embodiment of the disclosure, the usage rate of the narrow beams covered by each of the at least one wide beam is acquired through the following manners:

acquiring the number of time slots transmitted through the narrow beams covered by each of the at least one wide beam in a first specified period, and acquiring an average usage rate of each of the narrow beams based on the number of time slots;

acquiring a historical average usage rate of the narrow beams covered by each of the at least one wide beam; and acquiring the usage rate of the narrow beams covered by each of the at least one wide beam, based on the average usage rate and the historical average usage rate.

Specifically, first, for each of wide beams #m, the usage rates $R_{m,j}$ of all narrow beams covered by each of wide beams are initialized respectively; in the first specified period T1, the number of transmission time slots of each of narrow beams, that is, the number of time slots that are transmitted using the narrow beam #m, j during data transmission (i.e., the number of first time slots), is recorded in real time, denoted as $S_{m,j}$, wherein, the narrow beam number #m, j covered by the wide beam #m corresponds to the uniform narrow beam number n one-to-one; then the beam usage rate $$\overline{R}m, j = \frac{Sm, j}{\sum_{j=1}^{N/M} Sm, j}, m = 1, 2, ..., M,$$

is calculated, wherein, $\Sigma_{j=1}^{N/M}$ is the total number of time slots transmitted using all narrow beams covered by the wide beam #m (i.e., the number of second time slots); then the beam usage rate of the narrow beam #m,j for the current moment is calculated using the formula new_$R_{m,j}$=(1−α)*old_$R_{m,j}$+α*$\overline{R}_{m,j}$, wherein old_$R_{m,j}$ is the historical average beam usage rate of narrow beam #m,j, and $\overline{R}_{m,j}$ is the average beam usage rate of the narrow beam #m,j in the first specified period T1, α(0<α≤1) is a smoothing factor. The larger the value of α, the long-term average beam usage rate is closer to the beam usage rate in the current period, and the changes are more timely but also more dramatic; the smaller the value of α, the long-term average beam usage rate is closer to the historical long-term average beam usage rate, the changes are more stable, but the timeliness is poor. The default value of α is 0.25.

Figure 4:
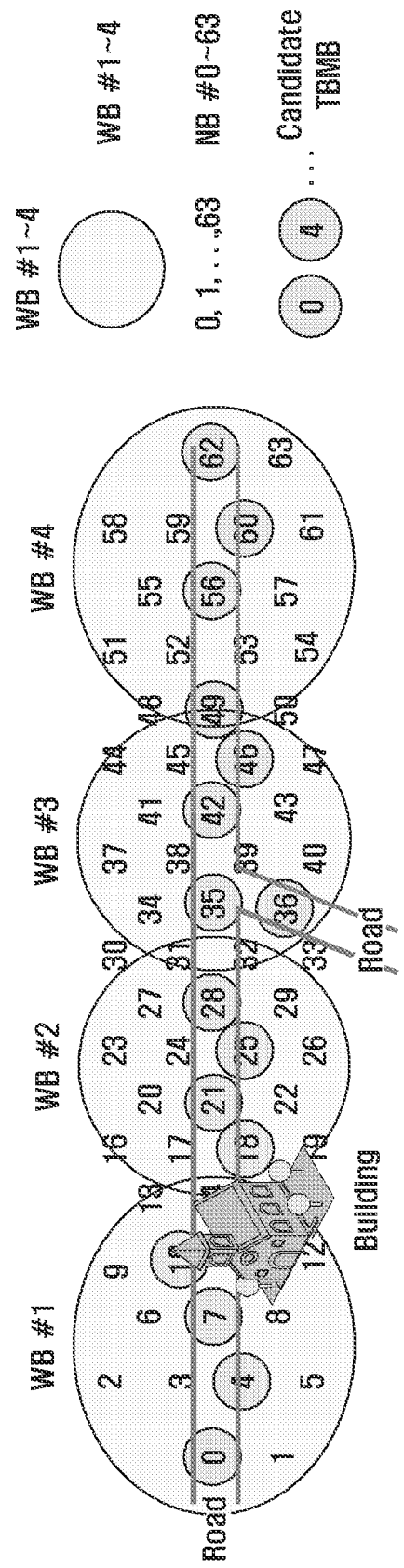
FIG. 4 is a schematic diagram of determining candidate to-be-measured narrow beams based on beam usage rate statistical information according to an embodiment of the disclosure.

FIG. 4 is a schematic diagram of determining candidate to-be-measured narrow beams based on beam usage rate statistical information according to an embodiment of the disclosure.

Referring to FIG. 4, it is a schematic diagram of determining candidate to-be-measured narrow beams based on beam usage statistical information in an embodiment of the disclosure. According to the above method, the numbers of the candidate to-be-measured narrow beams covered by the wide beam WB #1 are determined as 0, 4, 7, 10, and the numbers of the candidate to-be-measured narrow beams covered by the wide beam WB #2 are 18, 21, 25, 28, the number of candidate to-be-measured narrow beams covered by the wide beam WB #3 are 35, 36, 42, 46, and the number of candidate to-be-measured narrow beams covered by the wide beam WB #4 are 49, 56, 60, 62.

It should be noted that the selection rule of candidate to-be-measured narrow beams based on beam usage statistical information needs to be used according to the actual beam use conditions, and is dynamically updated, so the selection rules of candidate to-be-measured narrow beams based on beam usage statistical information may only be used after the system has been running normally for a period of time, and cannot be used in the initialization phase of the system.

Further, the use processes of the above-mentioned two candidate to-be-measured narrow beam selection rules may be expressed as follows: in the initialization phase of startup of system, the first selection rule based on beam spatial distribution information is used to select the candidate to-be-measured narrow beam set; after a period time of T2, the second selection rule based on beam usage rate statistical information is used to update the candidate to-be-measured narrow beam set.

However, in the following special circumstances, the first selection rule based on beam spatial distribution information is used: 1. the number of transmission slots of all narrow beams covered by a wide beam #m is zero, that is, all the narrow beams under the coverage of wide beam have not been used as beams for data transmission, then the candidate to-be-measured narrow beams under the coverage of wide beam are selected according to the first rule based on the beam spatial distribution information; 2. for a wide beam #m, when the average beam usage rate of the candidate to-be-measured narrow beams slightly differs from the average beam usage rate of the non-candidate to-be-measured narrow beams obtained by the first selection rule, for example, when the following formula is satisfied, the candidate to-be-measured narrow beams under the coverage of wide beam are selected using the first rule based on beam spatial distribution information:

$$\frac{\text{average}_{j\in\{TBMBC_{m,k}\}} R_{m,j} - \text{average}_{j\notin\{TBMBC_{m,k}\}} R_{m,j}}{\text{average}_{j\in\{TBMBC_{m,j}\}} R_{m,j}} < Thr\_R$$

$\text{average}_{j\in\{TBMBC_{m,k}\}} R_{m,j}$ is an average beam usage rate of the candidate to-be-measured narrow beams under the coverage of wide beam #m;

$\text{average}_{j\notin\{TBMBC_{m,k}\}} R_{m,j}$ is an average beam usage rate of the non-candidate to-be-measured narrow beams under the coverage of wide beam #m; and Thr_R is a predefined third threshold. The larger the Thr_R value is, it is easier to fall back to the first selection rule based on beam spatial distribution information. The smaller the Thr_R value is, it is easier to switch to the second selection rule based on beam usage statistical information. The default value of Thr_R may be set to Thr_R=0.5/(N/M), wherein N/M is the number of narrow beams covered by a wide beam.

In an optional embodiment of the disclosure, the determining the at least one to-be-measured narrow beam among the at least one candidate to-be-measured narrow beam corresponding to each of the at least one wide beam, based on received signal strength of reference signals transmitted through the at least one wide beam, may comprise: determining candidate to-be-measured narrow beams covered by a second predefined number of wide beams with the largest received signal strength as the at least one to-be-measured narrow beam, which is a relatively fixed method for determining to-be-measured narrow beams; or determining the at least one to-be-measured narrow beam among candidate to-be-measured narrow beams covered by two wide beams with the largest received signal strength, which is a relatively dynamic method for determining to-be-measured narrow beams. The two determination methods will be described in detail below.

It should be noted that the method for determining to-be-measured narrow beams is not limited to the above two methods, and different determination methods may also be adopted according to the actual requirements of the communication system.

Specifically, the relatively fixed method for determining to-be-measured narrow beams is specifically that, the base station determines the second predefined number of wide beams with the largest first RSRP value according to the first RSRP value of each of wide beams reported by the terminal, and then selects the candidate to-be-measured narrow beams under the coverage of the second predefined number of wide beams as the to-be-measured narrow beams. Wherein, the second predefined number is a positive integer.

Figure 5:
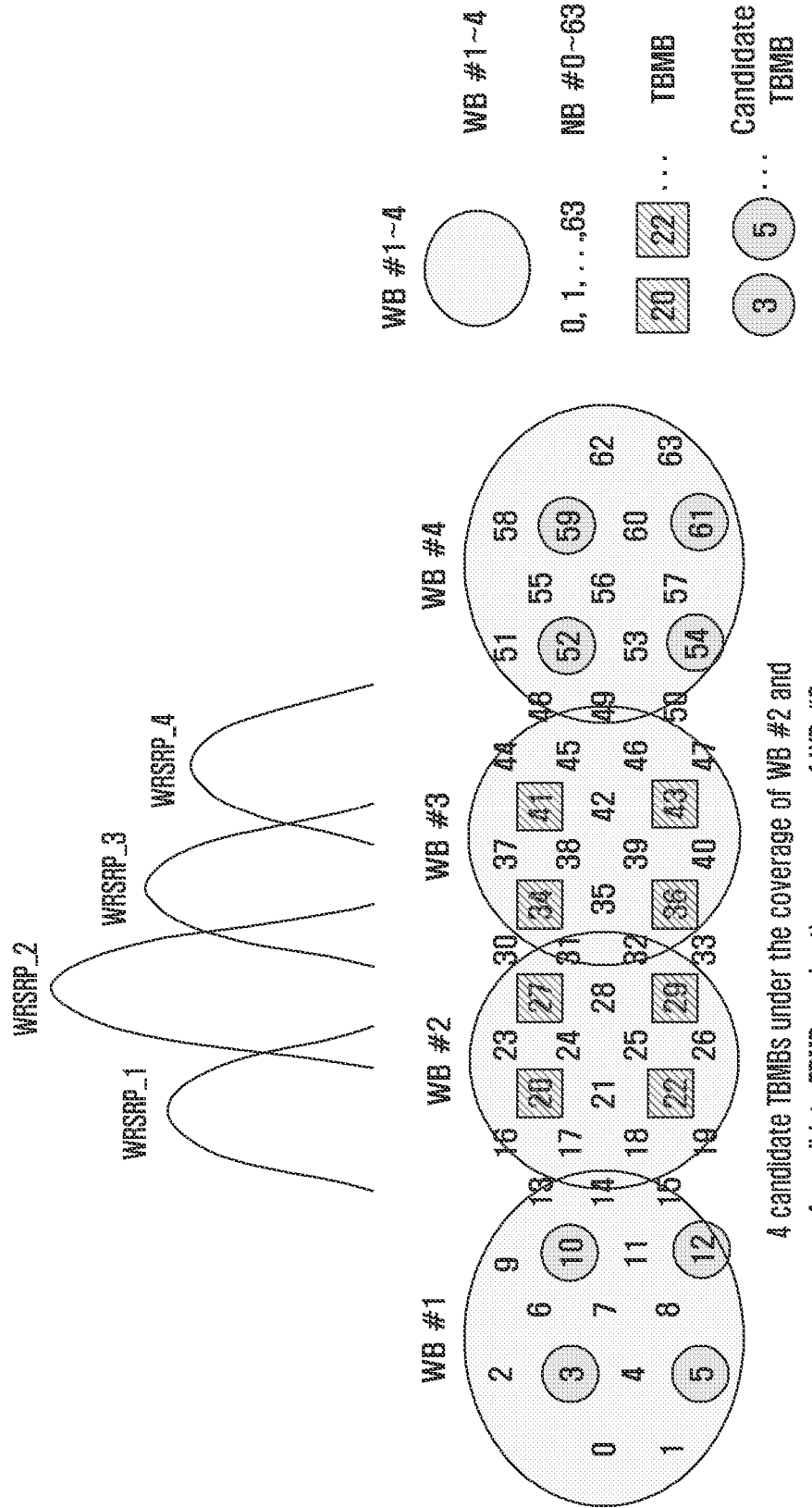
FIG. 5 is a schematic diagram of a relatively fixed method for determining to-be-measured narrow beams in an example of an according to embodiment of the disclosure.

FIG. 5 is a schematic diagram of a relatively fixed method for determining to-be-measured narrow beams in an example of an according to embodiment of disclosure.

Referring to FIG. 5, it is a schematic diagram of a relatively fixed method for determining to-be-measured narrow beams in an embodiment of the disclosure. In this example, the second predefined number is taken as 2. The four curves in the upper half of the figure represent the first RSRP values of the four wide beams reported by the terminal, where the first RSRP value (WRSRP_2) of wide beam WB #2 and the first RSRP value (WRSRP_3) of wide beam WB #3 are the two largest RSRP values. Therefore, the candidate to-be-measured narrow beams under the coverage of wide beam WB #2 and wide beam WB #3 are determined as the to-be-measured narrow beams, for example, N2=8 candidate to-be-measured narrow beams circled by "box (□)" shown in the lower half of the figure, that is, the to-be-measured narrow beams numbed as 20, 22, 27, 29, 34, 36, 41, 43.

In an optional embodiment of the disclosure, the determining the at least one to-be-measured narrow beam among the candidate to-be-measured narrow beams covered by two wide beams with the largest received signal strength, comprises:

acquiring a first difference in received signal strength between the two wide beams with the largest received signal strength;

if the first difference is greater than or equal to a first predefined threshold, determining candidate to-be-measured narrow beams covered by a wide beam with larger received signal strength among the two wide beams with the largest received signal strength, as the at least one to-be-measured narrow beam; and if the first difference is less than the first predefined threshold, determining a third predefined number of to-be-measured narrow beams among the candidate to-be-measured narrow beams covered by the wide beam with the larger received signal strength, and determining a fourth predefined number of to-be-measured narrow beams among candidate to-be-measured narrow beams covered by a wide beam with a lower received signal strength, among the two wide beams with the largest received signal strength.

Specifically, the relatively dynamic method for determining to-be-measured narrow beams is specifically that, the base station determines the two largest first RSRP values according to the first RSRP values of wide beams reported by the UE, and according to the difference between the two largest first RSRP values (i.e., the first difference), determines the candidate to-be-measured narrow beams under the coverage of one wide beam with a larger first RSRP value among the two wide beams as the to-be-measured narrow beams, or determines a part of the to-be-measured narrow beams under the coverage of the two wide beams as the to-be-measured narrow beams.

Specifically, when the difference between the highest first RSRP value (that is, the larger of the two first RSRP values) and the second highest first RSRP value (that is, the smaller of the two first RSRP values) is greater than or equal to the predefined threshold Thr_RSRP (that is, the first threshold), the candidate to-be-measured narrow beams under the coverage of wide beam with the highest first RSRP value is selected as the to-be-measured narrow beam. Wherein, the value of the predefined threshold Thr_RSRP may be obtained by calculating the average of the difference between the RSRP value of the strongest wide beam and the RSRP value of the second strongest wide beam, under the consideration of the UE terminal's own measurement error.

Figure 6:
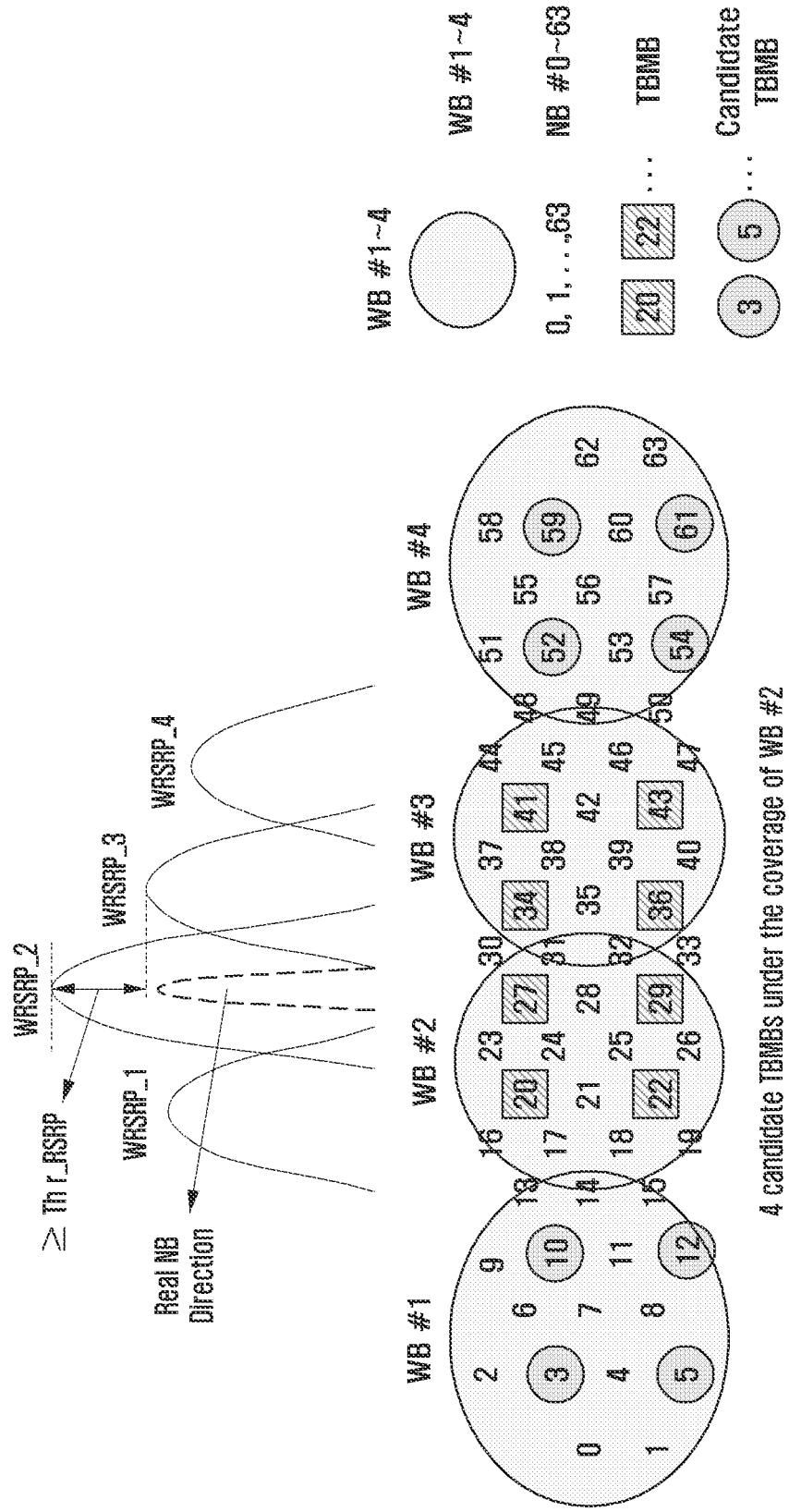
FIG. 6 is a schematic diagram of a relatively dynamic method for determining a to-be-measured narrow beams in an example of according to an embodiment of the disclosure.

FIG. 6 is a schematic diagram of a relatively dynamic method for determining a to-be-measured narrow beams in an example of according to an embodiment of the disclosure.

Referring to FIG. 6, it is a schematic diagram of a relatively dynamic method for determining to-be-measured narrow beams when the difference is greater than or equal to the first threshold in an embodiment of the disclosure. Referring to FIG. 6, the four curves in the upper half of the figure represent the first RSRP values of the four wide beams reported by the terminal, where the first RSRP value of the wide beam WB #2 (WRSRP_2) is the highest, and the first RSRP value of the wide beam WB #3 (WRSRP_3) is the second highest, and the difference between WRSRP_2 and WRSRP_3 is greater than or equal to the predefined threshold Thr_RSRP. At this time, the optimal narrow beam (i.e., the target narrow beam) direction is likely to point to the center direction of the wide beam WB #2 with the highest first RSRP value, as shown by the dotted line in the upper half of the figure. In this case, the base station selects the candidate to-be-measured narrow beams under the coverage of the wide beam WB #2 with the highest first RSRP value as the to-be-measured narrow beams, for example, N2=4 candidate to-be-measured narrow beams circled by "box (□)" shown in the lower half of the figure, that is, the to-be-measured narrow beams numbed as 20, 22, 27, 29.

In an optional embodiment of the disclosure, the determining a third predefined number of to-be-measured narrow beams among the candidate to-be-measured narrow beams covered by the wide beam with the larger received signal strength among the two wide beams with the greatest received signal strengthen, and the determining a fourth predefined number of to-be-measured narrow beams among candidate to-be-measured narrow beams covered by a wide beam with a lower received signal strength, among the two wide beams with the largest received signal strength, comprises:

determining at least one second narrow beam group among the candidate to-be-measured narrow beams covered by the wide beam with the larger received signal strength, wherein each of the at least one second narrow beam group includes a third predefined number of candidate to-be-measured narrow beams;

determining at least one third narrow beam group among the candidate to-be-measured narrow beams covered by the wide beam with the lower received signal strength, wherein each of the at least one third narrow beam group includes a fourth predefined number of candidate to-be-measured narrow beams; and acquiring a second difference between a center direction of each of the at least one second narrow beam group and a center direction of each of the at least one third narrow beam group respectively, and determining candidate to-be-measured narrow beams in both second narrow beam group and the third narrow beam group corresponding to the smallest second difference as the to-be-measured narrow beams.

Wherein, the third predefined number may equal to the fourth predefined number.

Specifically, when the difference between the highest first RSRP value and the second highest first RSRP value is less than the predefined threshold Thr_RSRP, the following candidate to-be-measured narrow beams are selected as the to-be-measured narrow beams: a part of the candidate to-be-measured narrow beams under the coverage of the wide beam with the highest first RSRP value and close to the wide beam with second highest first RSRP value, and a part of the candidate to-be-measured narrow beams under the coverage of the wide beam with the second highest first RSRP value and close to the wide beam with the highest first RSRP value.

Figure 7:
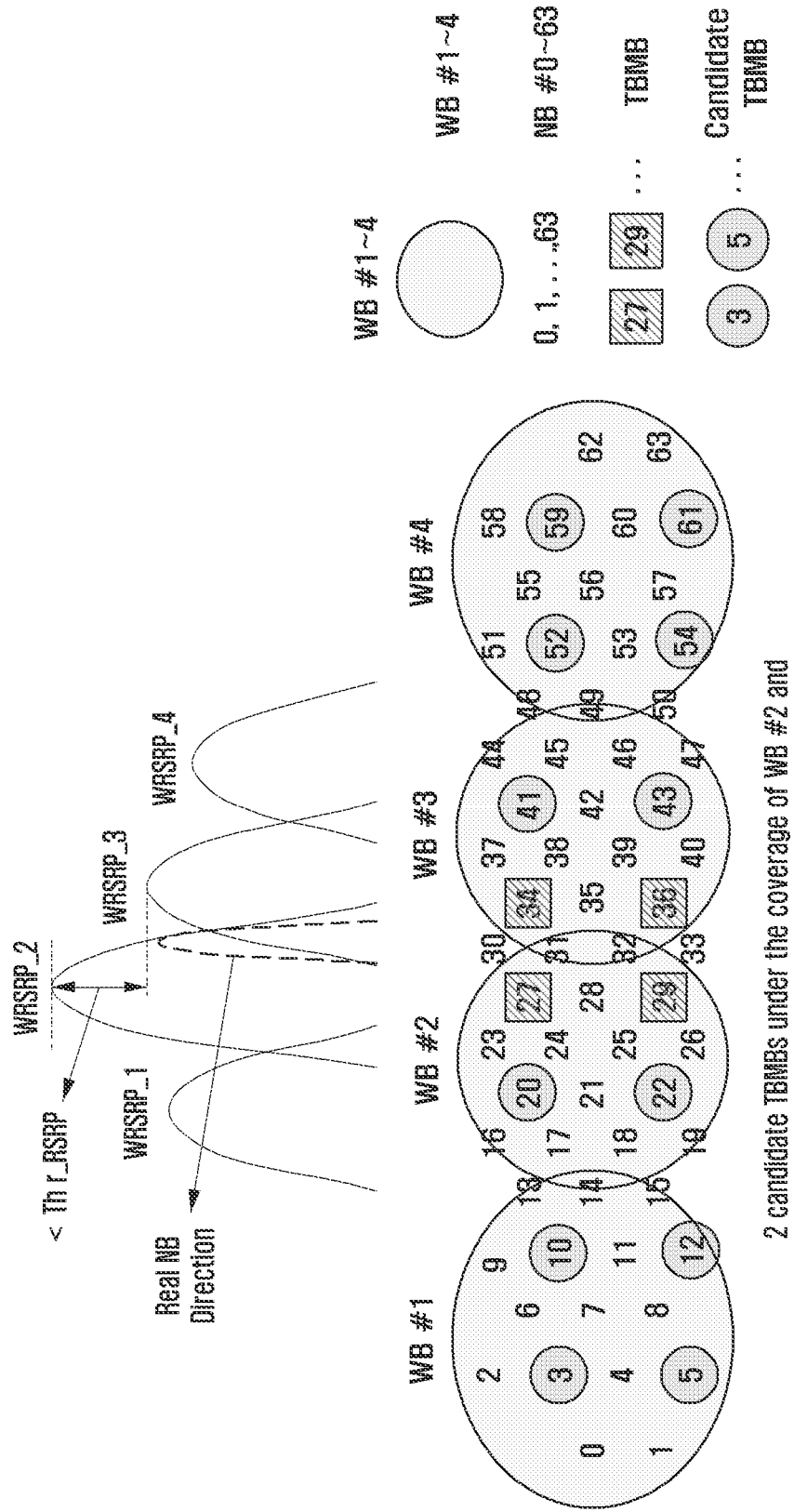
FIG. 7 is a schematic diagram of another relatively dynamic method for determining to-be-measured narrow beams in an example of according to an embodiment of the disclosure.

FIG. 7 is a schematic diagram of another relatively dynamic method for determining to-be-measured narrow beams in an example of according to an embodiment of the disclosure.

Referring to FIG. 7, it is a schematic diagram of a relatively dynamic to-be-measured narrow beam selection rule when the difference is less than the first threshold in an embodiment of the disclosure. Referring to FIG. 7, the four curves in the upper half of the figure represent the first RSRP values of the four wide beams reported by the terminal, where the first RSRP value of the wide beam WB #2 (WRSRP_2) is the highest, and the first RSRP value of the wide beam WB #3 (WRSRP_3) is the second highest, and the difference between WRSRP_2 and WRSRP_3 is less than the predefined threshold Thr_RSRP. At this time, the optimal beam direction is likely to point to the boundary of the wide beam WB #2 with the highest first RSRP value and the wide beam WB #3 with the second highest first RSRP value, as shown by the dotted line in the upper half of the figure. In this case, the base station selects a part of candidate to-be-measured narrow beams under the coverage of the wide beam WB #2 with the highest first RSRP value and close to the wide beam WB #3, and a part of the candidate to-be-measured narrow beams under the coverage of the wide beam WB #3 with the second highest first RSRP value and close to the wide beam WB #2 as the to-be-measured narrow beams, for example, N2=4 candidate to-be-measured narrow beams circled by "box (□)" shown in the lower half of the figure, that is, the to-be-measured narrow beams numbed as 27, 29, 34, 36.

The relatively dynamic method for determining to-be-measured narrow beam may make the direction of selected to-be-measured narrow beams closer to the true beam direction, and the UE may receive stronger reference signal power on these to-be-measured narrow beams, thereby increasing the accuracy of subsequent prediction of the target narrow beam. On the other hand, the relatively dynamic method for determining to-be-measured narrow beam may reduce the number of selected to-be-measured narrow beams, thereby saving the configuration overhead of CSI-RS resources and reducing the measurement burden of the UE.

Furthermore, the second difference between the center direction of the second narrow beam group and the center direction of the third narrow beam groups is acquired through the following manners:

acquiring a vertical direction angle and a horizontal direction angle of candidate to-be-measured narrow beams in both the second narrow beam group and the third narrow beam group; and acquiring the second difference between the center direction of the second narrow beam group and the center direction of the third narrow beam group, based on the vertical direction angle and the horizontal direction angle of the candidate to-be-measured narrow beams.

Specifically, when the difference between the highest RSRP value and the second highest RSRP value is less than the predefined threshold Thr_RSRP, it is necessary to select the part of the candidate to-be-measured narrow beams covered by the wide beam with the highest first RSRP value and close to the wide beam with the second highest first RSRP value and the part of the candidate to-be-measured narrow beams covered by the wide beam with the second highest first RSRP value and close to the wide beam with the highest first RSRP value as the to-be-measured narrow beams. The selection method is as follows:

First, the spatial direction information of K candidate to-be-measured narrow beams under the coverage of the wide beam with the highest first RSRP value, marked with a vertical direction angle $\theta_{m1,k1}$ and a horizontal direction angle $\varphi_{m1,k1}$, k1=0,1,2, ..., K-1, is obtained, where m1 is the number of the wide beam with the highest RSRP value, and the spatial direction information of the K candidate to-be-measured narrow beams under the coverage of the wide beam with the second highest first RSRP value, marked with a vertical direction angle $\theta_{m2,k2}$ and a horizontal direction angle $\varphi_{m2,k2}$, k2=0,1,2, ..., K-1, is obtained, where m2 is the number of the wide beam with the second highest first RSRP value.

Then, K/2 candidate to-be-measured narrow beams are selected from the K candidate to-be-measured narrow beams under the coverage of the wide beam with the highest first RSRP value (expressed as a first half beam set, that is, a second narrow beam group), that is, K/2 candidate to-be-measured narrow beams are randomly selected from the K candidate to-be-measured narrow beams to form the second narrow beam group. At the same time, K/2 candidate to-be-measured narrow beams are selected from the K candidate to-be-measured narrow beams under the coverage of the wide beam with the second highest first RSRP value (expressed as a second half beam set, that is, a third narrow beam group), that is, K/2 candidate to-be-measured narrow beams are randomly selected from the K candidate to-be-measured narrow beams to form the third narrow beam group.

Then, the difference between the center direction of the first half beam set and the center direction of the second half beam set (that is, the second difference) is calculated. That is, the second difference between the center direction of the second narrow beam group and the center direction of the third narrow beam group is calculated.

Here, the second difference between the center direction of the second narrow beam group and the center direction of the third narrow beam group is obtained by: obtaining a vertical direction angle and a horizontal direction angle of the candidate to-be-measured narrow beams in both the second narrow beam group and the third narrow beam group; based on the vertical direction angle and the horizontal direction angle of the candidate to-be-measured narrow beams, obtaining the second difference between the center direction of the second narrow beam group and the center direction of the third narrow beam group. In other words, the calculation formula for the difference between the center direction of the first half beam set and the center direction of the second half beam set is as follows:

$$\text{Angle\_diff} = \left[\underset{k1}{Ave}(\theta_{m1,k1}) - \underset{k2}{Ave}(\theta_{m2,k2})\right]^2 + \left[\underset{k1}{Ave}(\varphi_{m1,m1}) - \underset{k2}{Ave}(\varphi_{m2,k2})\right]^2,$$

wherein $$\underset{k1}{Ave}(\theta_{m1,k1})$$

means averaging the vertical direction angles of the K/2 candidate to-be-measured narrow beams in the first half beam set, $$\underset{k2}{Ave}(\theta_{m2,k2})$$

means averaging me vertical direction angles of K/2 candidate to-be-measured narrow beams in the second half beam set, $$\underset{k1}{Ave}(\varphi_{m1,m1})$$

means averaging the horizontal direction angles of K/2 candidate to-be-measured narrow beams in the first half beam set, $$\underset{k2}{Ave}(\varphi_{m2,k2})$$

means averaging the horizontal direction angles of K/2 candidate to-be-measured narrow beams in the second half beam set.

Finally, the K/2 candidate to-be-measured narrow beams in the first half beam set and K/2 candidate to-be-measured narrow beams in the second half beam set corresponding to the smallest second difference are selected as the final to-be-measured narrow beams, that is, the number of to-be-measured narrow beams is N2=K.

In an optional embodiment of the disclosure, the predicting a target narrow beam for transmitting data based on the received signal strength comprises:
predicting a target narrow beam for transmitting data by using a prediction model based on the received signal strength.

Furtherly, the predicting a target narrow beam for transmitting data by using a prediction model based on the received signal strength comprises:
acquiring received signal strength of the reference signals transmitted through the at least one wide beam;
acquiring historical received signal strength of the at least one wide beam and historical received signal strength of the at least one to-be-measured narrow beam; and
predicting the target narrow beam, by using the prediction model, based on the historical received signal strength of the at least one wide beam and the historical received signal strength of the at least one to-be-measured narrow beam, and the received signal strength of the at least one wide beam and the received signal strength of the at least one to-be-measured narrow beam.

Specifically, in the process of re-determining the target narrow beam this time, the base station may also use historical information, that is, the historical first RSRP value of at least one wide beam and the historical second RSRP value of at least one to-be-measured narrow beam in at least one previous predefined period, in addition to the first RSRP value of at least one wide beam and the second RSRP value of at least one to-be-measured narrow beam obtained in the current predefined period. Generally speaking, the historical first RSRP value of at least one wide beam and the historical second RSRP value of at least one to-be-measured narrow beam in the previous one predefined period of the current predefined period may be selected.

It is understandable that the historical first RSRP value of the at least one wide beam and the historical second RSRP value of the at least one to-be-measured narrow beam in the previous predefined period are information previously used by the base station to re-determine the corresponding target narrow beam.

In an optional embodiment of the disclosure, determining the target narrow beam based on at least one historical first RSRP value and at least one historical second RSRP value, and at least one first RSRP value and at least one second RSRP value includes:
predicting the target narrow beam, using a predefined prediction model, based on at least one historical first RSRP value and at least one historical second RSRP value, and at least one first RSRP value and at least one second RSRP value.

Specifically, in the foregoing embodiment, the base station may obtain the first RSRP values of the M wide beams reported by the UE, and the base station may obtain the second RSRP values of the N2 to-be-measured narrow beams reported by the UE. The base station composes the first RSRP values of the wide-beams and the second RSRP values of the narrow-beams, as well as the saved historical RSRP values, into corresponding data in a predefined format, and inputs it into a predefined prediction model for analyzing and processing to obtain corresponding prediction output result. According to the prediction result, the target narrow beam of the base station at the next moment is determined, and the beamforming is performed using a beamforming weight corresponding to the optimal narrow beam at the next moment to transmit data to the UE.

The format is predefined in which the base station composes the first RSRP values of the wide beams and the second RSRP values of the narrow beams reported by the UE into corresponding data.

Figure 8:
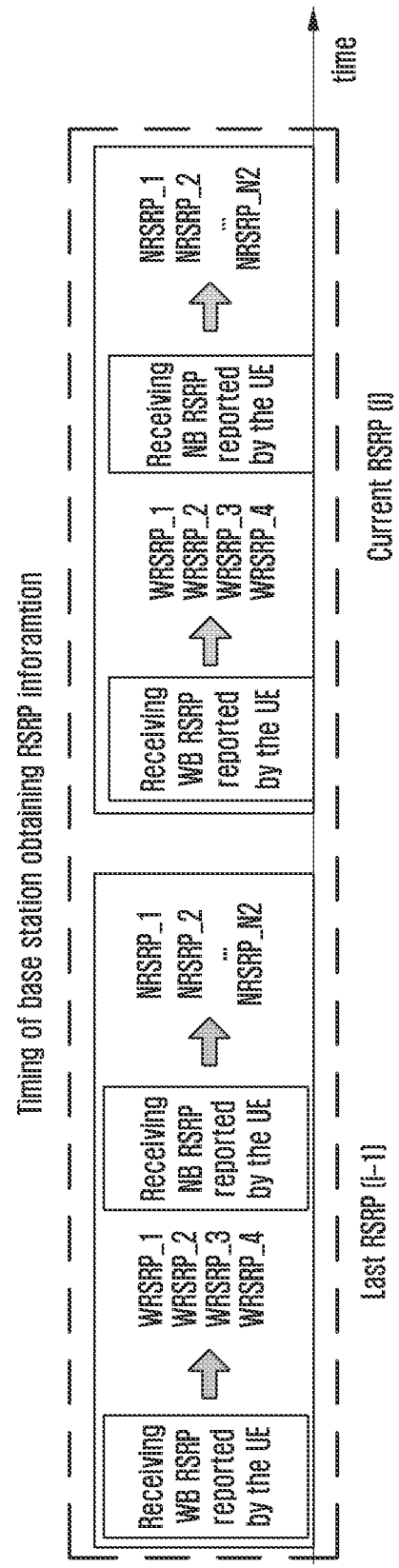
FIG. 8 is a timing diagram of the base station obtaining RSRP values reported by the UE in according to an embodiment of the disclosure.

FIG. 8 is a timing diagram of the base station obtaining RSRP values reported by the UE in according to an embodiment of the disclosure.

Referring to FIG. 8, it is a timing diagram of the base station obtaining the RSRP values reported by the UE in an embodiment of the disclosure. Referring to FIG. 8, a time step i is the currently received RSRP information, and a time step i-1 is the last received RSRP information, that is, the saved historical information. In each time step, the base station receives M=4 wide-beam RSRP values reported by the UE, namely WRSRP_1, WRSRP_2, WRSRP_3, WRSRP_4, and N2 to-be-measured narrow-beam RSRP values, namely NRSRP_1, NRSRP_2, . . . , NRSRP_N2.

FIG. 9A is a schematic diagram of a data format composed of first RSRP values of wide beams and second RSRP values of to-be-measured narrow beams in according to an embodiment of the disclosure.

Referring to FIG. 9A, it is a schematic diagram of the corresponding data format composed of wide beam RSRP value and narrow beam RSRP value in an embodiment of the disclosure. In the figure, the data at time step i-1, that is, the saved RSRP information last received, and the data at time step i, that is, the RSRP information currently received, form a two-dimensional matrix with a size of 2 columns*(M+N2) lines, that is the predefined data format.

Where, the predefined prediction model includes but is not limited to the following machine learning models: a Q function neural network model based on reinforcement learning, and a bidirectional long short-term memory network model (Bi-LSTM). The LSTM neural network model is good at extracting a feature change trend of different time steps in a sequence (such as text, speech, etc.), and the input of the predefined prediction model in the embodiment of the is the first RSRP value of the wide beam and the second RSRP value of the to-be-measured narrow beam measured in the current predefined period, as well as the first RSRP value of the wide beam and the second RSRP value of the to-be-measured narrow beam measured in the previous predefined period, therefore, it includes change information of RSRP on each beam in time. Therefore, using of the LSTM neural network model may effectively extract the RSRP change trend on each beam, thereby predicting the optimal narrow beam at the next moment.

Wherein, the prediction results output by the base station side through the predefined prediction model include at least one of the following: determining the optimal base station narrow beam for the served UE; determining whether to switch the narrow beam for the served UE; determining the number of the narrow beam to be switched for the served UE; and determining the ordering of multiple narrow beams for the served UE. Based on these prediction results, the target narrow beam may be further determined.

Where, the predefined prediction model is obtained through offline per-training and/or real-time online training. Where, the offline training process is that the base station pre-trains the predefined prediction model according to the typical antenna configuration and beam configuration of the base station before using the solution provided in the embodiment of the to obtain the trained model; the online training process is that the base station further trains or optimizes the pre-trained initial model according to the optimized beam configuration of the base station, the surrounding actual application environment (such as the distribution of roads, the occlusion of buildings), etc., after the base station deploys the actual scenes, so as the optimized online training model is more in line with the influence of factors such as the actual beam configuration and application environment of each base station.

Taking the predefined prediction model Q function neural network model as an example to illustrate the training and prediction process.

Figure 9B:
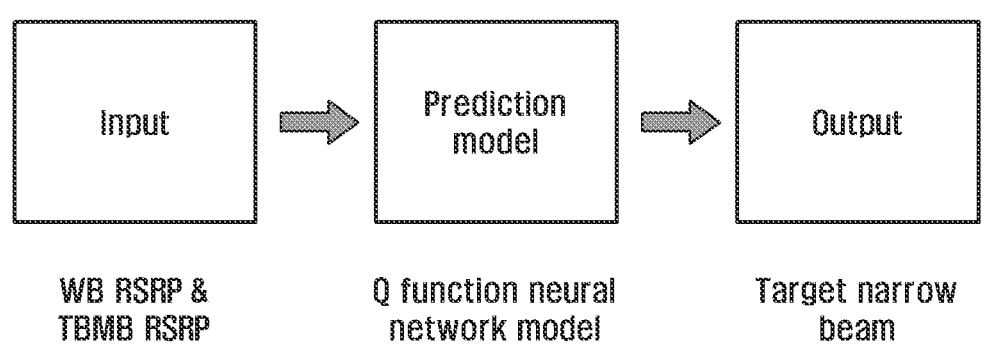
FIG. 9B is a schematic diagram of the input and output of a prediction model in the prediction phase in an example of according to an embodiment of the disclosure.

FIG. 9B is a schematic diagram of the input and output of a prediction model in the prediction phase in an example of according to an embodiment of the disclosure.

Referring to FIG. 9B, in the prediction phase, the input of the prediction model is the RSRP values of all wide beams and determined RSRP values of to-be-measured narrow beams corresponding to the current prediction period, and the output is the target narrow beam for the prediction time in the current prediction period.

Figure 9C:
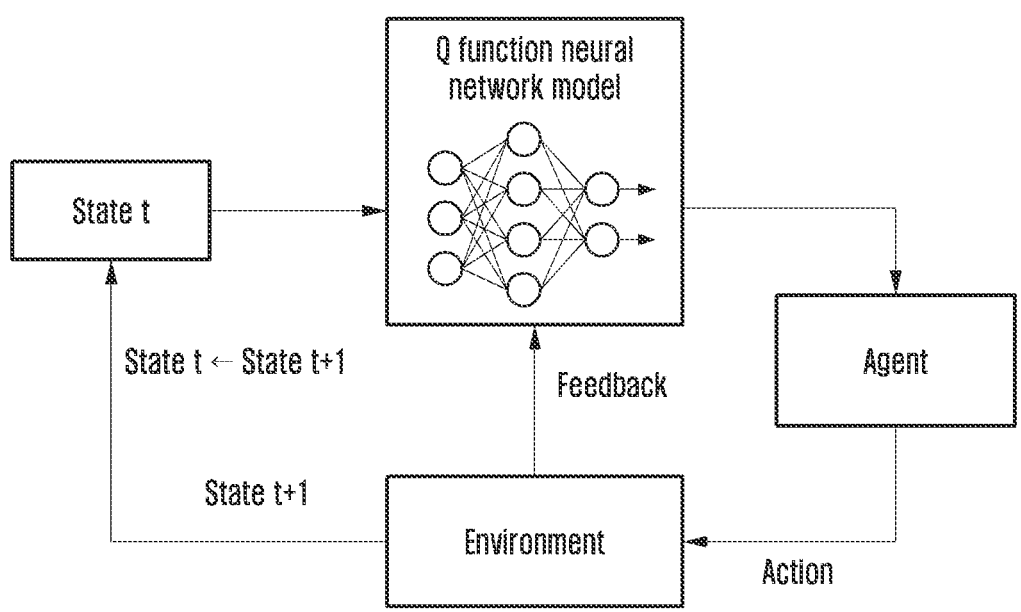
FIG. 9C is a schematic diagram of a training process of a prediction model according to an embodiment of the disclosure.

FIG. 9C is a schematic diagram of a training process of a prediction model according to an embodiment of the disclosure.

Referring to FIG. 9C, in the training phase, a large amount of training data will be used for training. Each piece of training data contains four parts: a current state (state t in the figure), a beam selection action (action in the figure), a state at next moment (state t+1 in the figure) and the reward and/or punishment provided by the environment (feedback in the figure). The above-mentioned current state is the input data in a predefined format composed of the wide-beam RSRP values and the to-be-measured narrow-beam RSRP values measured and reported by the UE and obtained by the base station; the above-mentioned beam selection action is the target narrow beam selected by the base station; the above-mentioned state at next moment is the RSRP value obtained by the base station after beam switching, in the same data format as that of the current state; the above-mentioned reward and/or punishment provided by the environment is the evaluation of use effect of the switched target narrow beam.

Further, for a UE under special circumstances, such as a fast-moving UE, a predefined prediction model including at least two prediction sub-models may be used for prediction, that is, a multi-model prediction scheme. Specifically, when the UE is moving fast, the optimal beam for the base station to serve the UE may change frequently. If the above-mentioned single neural network model is still used, the base station may not be able to predict the optimal beam quickly and accurately, such that the beam used for the base station transmitting data to the UE cannot be switched to the optimal beam in time, which causes the quality of the transmission signal to decrease, the transmission error rate to increase, and finally the system performance to deteriorate. For such a fast-moving UE, an embodiment of the disclosure provides a multi-model prediction scheme, that is, multiple prediction sub-models are used for prediction simultaneously for selecting optimal beam at different time points (i.e., different next moments).

In an optional embodiment of the disclosure, the prediction model includes at least two prediction sub-models, the method further comprises:
  acquiring movement state information of a user equipment (UE), wherein the movement state information indicates movement speed of the UE; and
  determining a prediction sub-model for predicting the target narrow beam among at least two prediction sub-models of the predefined prediction model, based on the movement state information.

Furthermore, the predicting a target narrow beam for transmitting data by using a prediction model based on the received signal strength comprises:
  predicting the target narrow beam for transmitting data by using the determined prediction sub-model based on the acquired received signal strength.

Wherein, the movement state information is used to represent the movement speed of the UE, and the movement state information of the UE may include: the movement speed value of the UE or the switching times of activated beam of the UE in the second specified period. The movement speed may be further subdivided. That is, when the movement speed is in different ranges, different numbers of prediction sub-modules may be used to make predictions at the same time. The following will describe by taking the movement speed as low speed, medium speed and high speed as examples respectively. A single-model (that is, one prediction sub-model) is used to predict when the movement speed is the low speed. A dual-model (that is, two prediction sub-models) is used to predict when the movement speed is the medium speed. A full-model (i.e., multiple prediction sub-models) is used to predict when the movement speed is the high speed. In other words, when the base station detects that a UE is moving at a low speed or the movement of the UE has not detected, the base station uses a default single-model prediction scheme for the UE; when the base station detects that a UE is moving at a medium speed, the base station uses a dual-model prediction scheme for the UE; when the base station detects that a UE is moving at a medium-to-high speed, the base station uses a full-model prediction scheme for the UE, that is, uses all the configured models of the base station to predict.

It is understandable that the division of the above-mentioned movement speed range is not limited to low speed, medium speed, and high speed. For example, it may also be divided into a first speed range, a second speed range, a third speed range, . . . , the Nth speed range, etc., where N is a positive integer.

Figure 10:
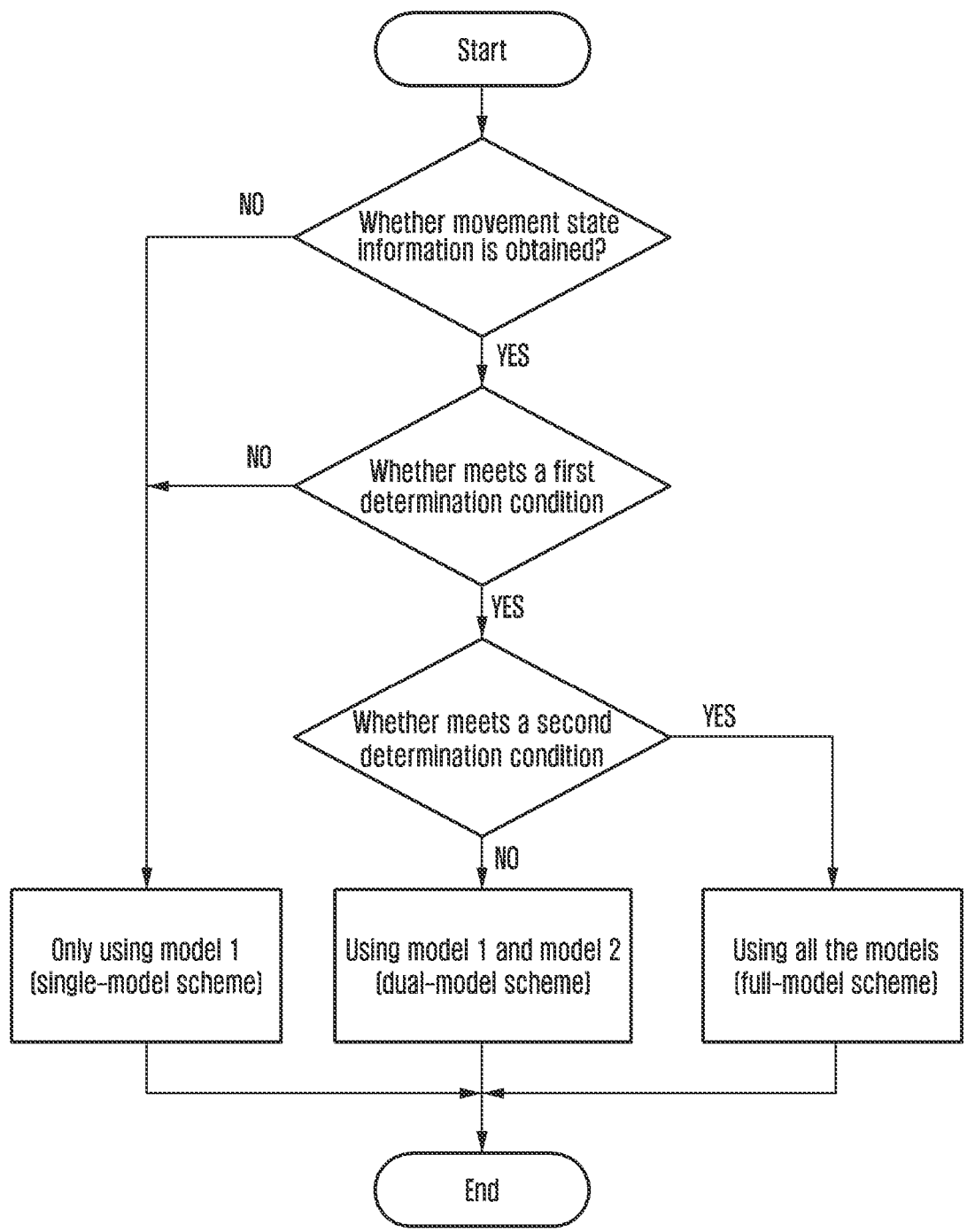
FIG. 10 is a schematic flowchart of determining of the use of a multi-model prediction scheme according to an embodiment of the disclosure.

FIG. 10 is a schematic flowchart of determining of the use of a multi-model prediction scheme according to an embodiment of the disclosure.

Referring to FIG. 10, it is a schematic flowchart for determining the use of the multi-model prediction scheme in an embodiment of the disclosure. In the first operation, it is determined whether the movement state information of a UE is obtained. If the base station has not obtained the movement state information of the UE, the default single-model prediction scheme is used; if the movement state information of the UE has been obtained, proceeding to the determination of the second operation. In the second operation, it is determined whether the obtained movement state information of the UE meets a first determination condition. If the first determination condition is not met, the default single-model prediction scheme is still used; and if the first determination condition is met, proceeding to the determination of the third operation. In the third operation, it is determined whether the obtained movement state information of the UE meets a second determination condition. If the second determination condition is not met, a dual-model prediction scheme is used for prediction, for example, a machine learning model 1 and a machine learning model 2 are used for prediction; and if the second determination condition is met, a multi-model prediction scheme is used, that is, all configured models of the base station are used for prediction.

The movement state information here, specifically, may be the following information: for UEs of R16 version and above, the base station may request the UE to report speed information through an RRC message, so the base station may directly obtain the UE's movement speed value, and then may use the movement speed value reported by the UE to directly determine. For UEs of version R15 and below, the UE does not support the reporting of speed information, and other information related to the movement speed needs to be used to implicitly indicate the movement speed of the UE, such as the switching times of activated beam of the UE in a specified period. If the switching times of activated beam of a UE is large in a specified period, it may reflect that the UE has a high movement speed to a certain extent.

According to the difference in the specific content of the above-mentioned movement state information, the process for determining the use of the multi-model prediction scheme may be further expressed as the following process.

For UEs of R16 version and above, in the first operation, it is determined whether the movement speed value reported by the UE has been obtained. If the base station has not obtained the movement speed value reported by the UE, the default single-model prediction scheme is used; if the base station has obtained the movement speed value reported by the UE, proceeding to the determination of the second operation. In the second operation, it is determined whether the last reported movement speed value of the UE is greater than a first speed threshold Thr1_speed. If the last reported movement speed value of the UE is less than or equal to the first speed threshold, the default single-model prediction scheme is still used; and if the last reported movement speed value of the UE is greater than the first speed threshold, then proceeding the determination of the third operation. In the third operation, it is determined whether the last reported movement speed value of the UE is greater than a second speed threshold Thr2_speed. If the last reported movement speed value of the UE is less than or equal to the second speed threshold, a dual-model prediction scheme is used, for example, the machine learning model 1 and the machine learning model 2 are used for prediction; and if the last reported movement speed value of the UE is greater than the second speed threshold, the full-model prediction scheme is used, that is, all the configured models of the base station are used for prediction.

For UEs of version R15 and below, in the first operation, it is determined whether the switching times of activated beam of the UE in the specified period has been obtained by statistics. If the base station has not obtained the switching times of activated beam of the UE in the specified period, the default single-model prediction scheme is used; and if the switching times of activated beam of the UE in the specified period has been obtained, proceeding to the determination of the second operation. In the second operation, it is determined whether the switching times of activated beam of the UE in the specified period is greater than a first beam switching threshold Thr1_beamswitch. If the switching times of activated beam of the UE in the specified period is less than or equal to the first beam switching threshold, the default single-model prediction scheme is still used; if the switching times of activated beam of the UE in the specified period is greater than the first beam switching threshold, proceeding to the determination of the third operation. In the third operation, it is determined whether the switching times of activated beam of the UE in the specified period is greater than a second beam switching threshold Thr2_beamswitch. If the switching times of activated beam of the UE in the specified period is less than or equal to the second beam switching threshold, a dual-model prediction scheme is used, for example, the machine learning model 1 and machine learning model 2 are used for prediction; and if the switching times of activated beam of the UE in the specified period is greater than the second beam switching threshold, a full-model prediction scheme is used, that is, all configured models of the base station are used for prediction.

Figure 11:
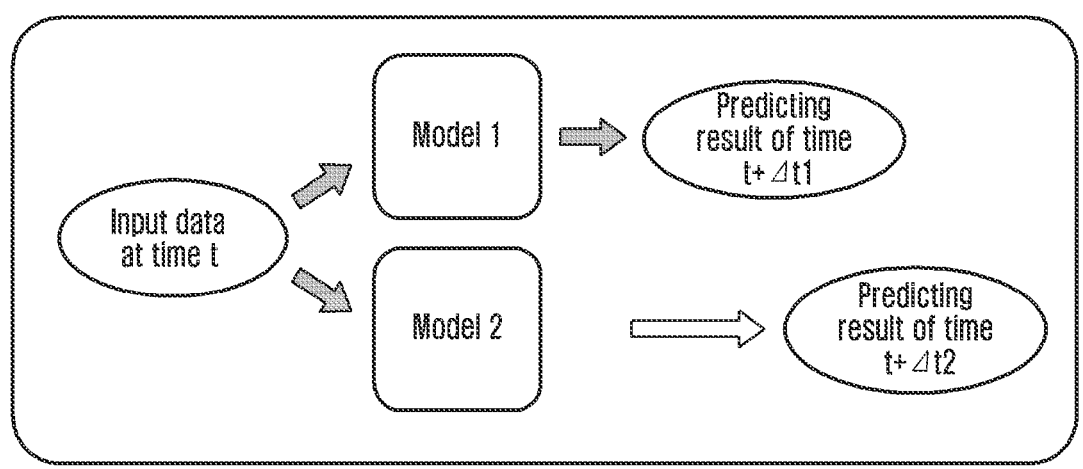
FIG. 11 is a schematic diagram of a dual-model prediction solution in according to an embodiment of the disclosure.

FIG. 11 is a schematic diagram of a dual-model prediction solution in according to an embodiment of the disclosure.

Referring to FIG. 11, it is a schematic diagram of a dual-model prediction scheme in an embodiment of the disclosure, where input information at time t is input into a machine learning model 1 and a machine learning model 2 at the same time, and then two prediction results, which are used for predicting the result at t+Δt1 and the result at t+Δt2 respectively, are output.

Figure 12:
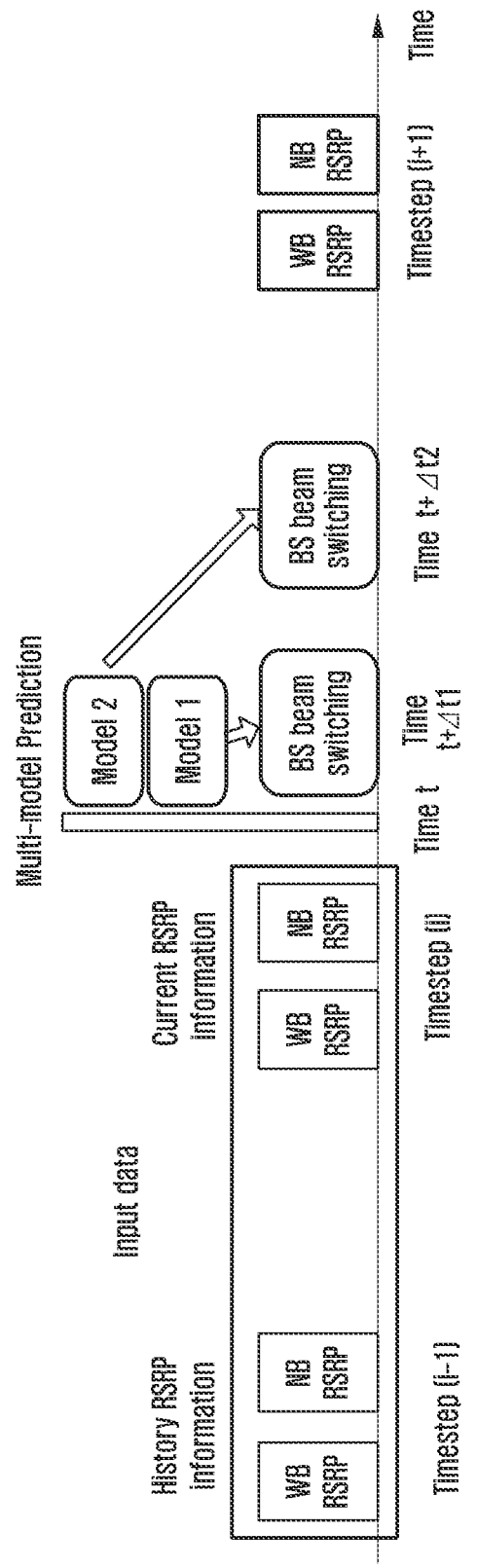
FIG. 12 is a timing diagram of a base station using a dual-model prediction scheme for beam switching at two time points in according to an embodiment of the disclosure.

FIG. 12 is a timing diagram of a base station using a dual-model prediction scheme for beam switching at two time points in according to embodiment of the disclosure.

Referring to FIG. 12, it is a timing diagram of a base station using a dual-model prediction scheme for beam switching at two time points in an embodiment of the disclosure. In the figure, the base station composes the first RSRP value of the wide beam and the second RSRP value of the narrow beam obtained currently at time t, as well as the saved first and second RSRP values obtained last time, into corresponding data in a predefined format, performs corresponding data preprocessing, and then inputs the preprocessed data into the predetermined machine learning model 1 and machine learning model 2 for analyzing and processing. The machine learning model 1 outputs a prediction result 1, which is used to determine the optimal narrow beam NB_op1 at time t+Δt1, and the machine learning model 2 outputs the prediction result 2, which is used to determine the optimal narrow beam NB_op2 at the time t+Δt2. The base station determines whether to perform beam switching at time t+Δt1. If the currently used activated narrow beam is different from the predicted optimal narrow beam NB_op1, the beam switching is performed to switch the activated narrow beam to the narrow beam NB_op1, and the beamforming is performed using the beamforming weight corresponding to the narrow beam NB_op1 for transmitting data to the UE. Then, the base station determines whether to perform beam switching at time t+Δt2. If the currently used activated narrow beam is different from the predicted optimal narrow beam NB_op2, the base station performs the beam switching to switch the activated narrow beam to narrow beam NB_op2, and the beamforming is performed using the beamforming weight corresponding to the narrow beam NB_op2 for transmitting data to the UE.

For the full-model prediction scheme, its basic structure and flowchart are similar to the dual-model prediction scheme. The basic schematic diagram of the full-model prediction scheme and the timing diagram of the full-model prediction scheme being used for beam switching at multiple time points will not be repeated here.

The multi-model prediction scheme in the embodiment of the disclosure may use multiple prediction sub-models for prediction and selection of the optimal beam at different time points, only by using the first RSRP of wide beam and the second RSRP of narrow beam reported by a normal UE. Therefore, it does not increase additional SSB or CSI-RS measurement resource overhead, and does not increase the measurement burden of the UE. The multi-model prediction scheme in the embodiment of the disclosure is suitable for fast-moving UEs. The base station may perform multiple predictions of optimal narrow beam within one period for the UE reporting RSRP, so that the base station has more opportunities to choose better beam, may switch to the optimal narrow beam quickly and in time, thereby improving the accuracy of beam selection, improving signal transmission quality, further reducing the possibility of link interruption, and improving system throughput.

Figure 13:
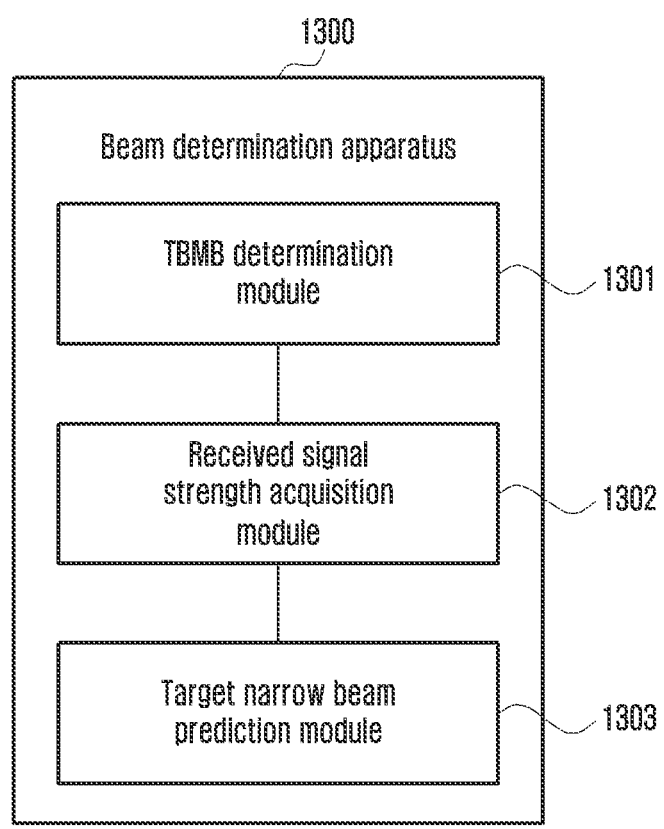
FIG. 13 is a structural block diagram of a beam determination apparatus provided according to an embodiment of the disclosure.

FIG. 13 is a structure block diagram of a beam determination apparatus provided according to an embodiment of the disclosure.

Referring to FIG. 13, the beam determination apparatus 1300 may include: a to-be-measured narrow beam determination module 1301, a received signal strength acquisition module 1302 and a target narrow beam prediction module 1303.

The to-be-measured narrow beam determination module 1301 is configured to determine at least one to-be-measured narrow beam among narrow beams corresponding to at least one wide beam.

The received signal strength acquisition module 1302 is configured to acquire received signal strength of reference signals transmitted through at least one to-be-measured narrow beam.

The target narrow beam prediction module 1303 is configured to predict a target narrow beam for transmitting data based on the received signal strength.

In the solution provided in the disclosure, in the process of determining the target narrow beam, the UE only needs to measure the received signal strength of the reference signals transmitted by a part of the narrow beams in the system, thereby reducing the occupation of measurement resources, reducing the measurement burden of UE and reducing the power consumption of the UE.

In an optional embodiment of the disclosure, the to-be-measured narrow beam determination module includes a candidate to-be-measured narrow beam determination sub-module and a to-be-measured narrow beam determination sub-module.

The candidate to-be-measured narrow beam determination sub-module is configured to acquire at least one candidate to-be-measured narrow beam corresponding to each of the at least one wide beam.

The to-be-measured narrow beam determination sub-module is configured to determine the at least one to-be-measured narrow beam among the at least one candidate to-be-measured narrow beam corresponding to each of the at least one wide beam, based on received signal strength of reference signals transmitted through the at least one wide beam.

In an optional embodiment of the disclosure, the candidate to-be-measured narrow beam determination sub-module is configured to:

determine the at least one candidate to-be-measured narrow beam, based on spatial distribution information of narrow beams covered by each of the at least one wide beam.

In an optional embodiment of the disclosure, the candidate to-be-measured narrow beam determination sub-module is further configured to:

determine at least one first narrow beam group including a first predefined number narrow beams, among the narrow beams covered by each of the at least one wide beam;

acquiring a region area covered by each of the at least one first narrow beam group, based on the spatial distribution information of narrow beams in each of the at least one first narrow beam group; and determine a first predefined number narrow beams in a first narrow beam group which covers the largest region area, as the at least one candidate to-be-measured narrow beam.

In an optional embodiment of the disclosure, the candidate to-be-measured narrow beam determination sub-module is specifically configured to:

determine the at least one candidate to-be-measured narrow beam, based on usage rate of narrow beams covered by each of the at least one wide beam.

In an optional embodiment of the disclosure, the candidate to-be-measured narrow beam determination sub-module is further configured to:

determine a first predefined number narrow beams with the maximum usage rate among the narrow beams covered by each of the at least one wide beam, as the at least one candidate to-be-measured narrow beam.

In an optional embodiment of the disclosure, the candidate to-be-measured narrow beam determination sub-module is further configured to:

acquire the number of time slots transmitted through the narrow beams covered by each of the at least one wide beam in a first specified period, and acquire an average usage rate of the narrow beams based on the number of time slots;

acquire a historical average usage rate of the narrow beams covered by each of the at least one wide beam; and acquire the usage rate of the narrow beams covered by each of the at least one wide beam, based on the average usage rate and the historical average usage rate.

In an optional embodiment of the disclosure, the to-be-measured narrow beam determination sub-module is specifically configured to:

determine candidate to-be-measured narrow beams covered by a second predefined number of wide beams with the largest received signal strength as the at least one to-be-measured narrow beam; or determine the at least one to-be-measured narrow beam among candidate to-be-measured narrow beams covered by two wide beams with the largest received signal strength.

In an optional embodiment of the disclosure, the to-be-measured narrow beam determination sub-module is further configured to:

acquire a first difference in received signal strength between the two wide beams with the largest received signal strength;

if the first difference is greater than or equal to a first predefined threshold, determine candidate to-be-measured narrow beams covered by a wide beam with larger received signal strength among the two wide beams with the largest received signal strength, as the at least one to-be-measured narrow beam; and if the first difference is less than the first predefined threshold, determine a third predefined number of to-be-measured narrow beams among the candidate to-be-measured narrow beams covered by the wide beam with the larger received signal strength, and determine a fourth predefined number of to-be-measured narrow beams among candidate to-be-measured narrow beams covered by a wide beam with a lower received signal strength, among the two wide beams with the largest received signal strength.

In an optional embodiment of the disclosure, the to-be-measured narrow beam determination sub-module is further configured to:

determine at least one second narrow beam group among the candidate to-be-measured narrow beams covered by the wide beam with the larger received signal strength, wherein each of the at least one second narrow beam group includes a third predefined number of candidate to-be-measured narrow beams;

determine at least one third narrow beam group among the candidate to-be-measured narrow beams covered by the wide beam with the lower received signal strength, wherein each of the at least one third narrow beam group includes a fourth predefined number of candidate to-be-measured narrow beams; and acquire a second difference between a center direction of each of the at least one second narrow beam group and a center direction of each of the at least one third narrow beam group respectively, and determine candidate to-be-measured narrow beams in both second narrow beam group and third narrow beam group corresponding to the smallest second difference as the to-be-measured narrow beams.

In an optional embodiment of the disclosure, the to-be-measured narrow beam determination sub-module is further configured to:

acquire a vertical direction angle and a horizontal direction angle of candidate to-be-measured narrow beams in both the second narrow beam group and the third narrow beam group; and acquire the second difference between the center direction of the second narrow beam group and the center direction of the third narrow beam group, based on the vertical direction angle and the horizontal direction angle of the candidate to-be-measured narrow beams.

In an optional embodiment of the disclosure, the third predefined number is equal to the fourth predefined number.

In an optional embodiment of the disclosure, the target narrow beam prediction module is specifically configured to:

predict a target narrow beam for transmitting data by using a prediction model based on the received signal strength.

In an optional embodiment of the disclosure, the apparatus further includes a prediction sub-model determination module, configured to:

acquire movement state information of a user equipment (UE), wherein the movement state information indicates movement speed of the UE; and determine a prediction sub-model for predicting the target narrow beam among at least two prediction sub-models of the predefined prediction model, based on the movement state information.

The target narrow beam prediction module is specifically configured to:

predict the target narrow beam for transmitting data by using the determined prediction sub-model based on the acquired received signal strength.

In an optional embodiment of the disclosure, if the determined prediction sub-model includes at least two prediction sub-models, each of which corresponds to a prediction moment, the target narrow beam prediction module is specifically configured to:

predict the target narrow beam for corresponding prediction moment separately by using each of determined prediction sub-models based on the acquired received signal strength.

In an optional embodiment of the disclosure, the acquiring movement state information of a UE comprises: acquiring movement speed value of the UE or a switching times of activated beam of the UE in a second specified period.

In an optional embodiment of the disclosure, the target narrow beam prediction module is specifically configured to:

acquire received signal strength of the reference signals transmitted through the at least one wide beam;

acquire historical received signal strength of the at least one wide beam and historical received signal strength of the at least one to-be-measured narrow beam; and predict the target narrow beam, by using the prediction model, based on the historical received signal strength of the at least one wide beam and the historical received signal strength of the at least one to-be-measured narrow beam, and the received signal strength of the at least one wide beam and the received signal strength of the at least one to-be-measured narrow beam.

Figure 14:
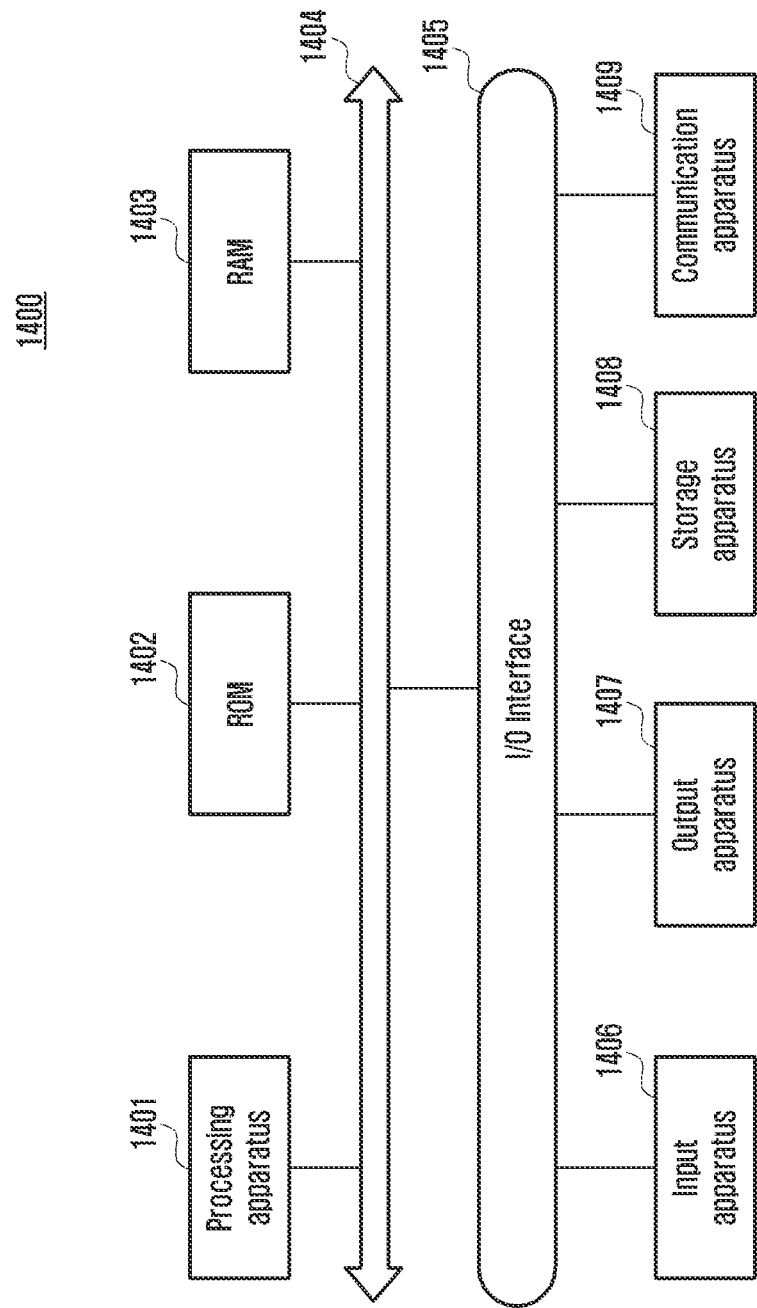
FIG. 14 is a schematic structural diagram of an electronic device provided according to an embodiment of the disclosure.

FIG. 14 is a schematic structural diagram of an electronic device provided according to an embodiment of the disclosure.

Referring to FIG. 14, which shows a schematic structural diagram of an electronic device (for example, a terminal device or a server that executes the method shown in FIG. 2*a*) 1400 suitable for implementing the embodiments of the disclosure. The electronic devices in the embodiments of the disclosure may include, but are not limited to, mobile terminals such as mobile phones, notebook computers, digital broadcast receivers, PDAs (personal digital assistants), PADs (tablet computers), PMPs (portable multimedia players), vehicle terminals (for example, vehicle navigation terminals), and wearable devices, and fixed terminals such as digital TVs and desktop computers. The electronic device shown in FIG. 14 is only an example, and should not bring any limitation to the function and scope of use of the embodiments of the disclosure.

The electronic device includes: a memory and a processor, where the memory is used to store programs for executing the methods described in the foregoing method embodiments; and the processor is configured to execute the programs stored in the memory. The processor here may be referred to as the processing apparatus 1401 described below, and the memory may include at least one of a read-only memory (ROM) 1402, a random access memory (RAM) 1403, and a storage apparatus 1408, specifically as follows:

Referring to FIG. 14, the electronic device 1400 may include a processing apparatus (such as a center processing unit, a graphics processor) 1401, which may executes various appropriate actions and processing according to a program stored in a read-only memory (ROM) 1402 or a program loaded into a random access memory (RAM) 1403 from a storage apparatus 1408. In the RAM 1403, various programs and data required for the operation of the electronic device 1400 are also stored. The processing apparatus

1401, ROM 1402, and RAM 1403 are connected to each other through a bus 1404. An input/output (I/O) interface 1405 is also connected to the bus 1404.

Generally, the following apparatuses may be connected to the I/O interface 1405: input apparatus 1406 including such as touch screen, touch pad, keyboard, mouse, camera, microphone, accelerometer, gyroscope; an output apparatus 1407 including such as liquid crystal display (LCD), speaker, vibration; a storage apparatus 1408 including such as a magnetic tape, a hard disk; and a communication apparatus 1409. The communication apparatus 1409 may allow the electronic device 1400 to perform wireless or wired communication with other devices to exchange data. Although FIG. 14 shows an electronic device having various apparatuses, it should be understood that it is not required to implement or have all of the illustrated apparatuses. It may be implemented alternatively or provided with more or fewer apparatuses.

In particular, according to the embodiments of the disclosure, the process described above with reference to the flowchart may be implemented as a computer software program. For example, the embodiments of the disclosure include a computer program product, which includes a computer program carried on a non-transitory computer readable medium, and the computer program includes program code for executing the method shown in the flowchart. In such an embodiment, the computer program may be downloaded and installed from the network through the communication apparatus 1409, or installed from the storage apparatus 1408, or installed from the ROM 1402. When executed by the processing apparatus 1401, the computer program executes the above-mentioned functions defined in the method of the embodiment of the disclosure.

It should be noted that the above-mentioned computer-readable storage medium in the disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or a combination of any of the above. More specific examples of computer-readable storage media may include, but not limited to: electrical connections with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the disclosure, the computer-readable storage medium may be any tangible medium that contains or stores a program, which may be used by or in combination with an instruction execution system, apparatus, or device. In the disclosure, the computer-readable signal medium, therein carried a computer-readable program code, may include a data signal propagated in baseband or as a part of a carrier wave. This propagated data signal may take many forms, including but not limited to, electromagnetic signal, optical signal, or any suitable combination of the above. The computer-readable signal medium may also be any computer-readable medium other than the computer-readable storage medium. The computer-readable signal medium may send, propagate, or transmit the program for use by or in combination with the instruction execution system, apparatus, or device. The program code contained on the computer-readable medium may be transmitted by any suitable medium, including but not limited to: wire, optical cable, radio frequency (RF), or any suitable combination of the above.

In some embodiments, the client and server may communicate with any currently known or future-developed network protocols such as HyperText Transfer Protocol (HTTP), and may interconnect with digital data communication (for example, communication network) in any form or medium. Examples of communication networks include a local area network (LAN), a wide area network (WAN), an Internet Protocol (IP) network (for example, the Internet), and an end-to-end network (for example, ad hoc end-to-end network), as well as any currently known or future-developed network.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device:

determines at least one to-be-measured narrow beam among narrow beams corresponding to at least one wide beam; acquires received signal strength of reference signals transmitted through at least one to-be-measured narrow beam; and predicts a target narrow beam for transmitting data based on the received signal strength.

The computer program code used to perform the operations of the disclosure may be written in one or more programming language(s) or a combination thereof. The above-mentioned programming languages include but are not limited to object-oriented programming languages, such as Java, Smalltalk, C++, and also include conventional procedural programming languages, such as C language or similar programming languages. The program code may be executed entirely on the user's computer, partly on the user's computer, executed as an independent software package, partly on the user's computer and partly executed on a remote computer, or entirely executed on the remote computer or server. In the case of a remote computer, the remote computer may be connected to the user's computer through any kind of network, including a local area network (LAN) or a wide area network (WAN), or may be connected to an external computer (for example, connection via Internet by using an Internet service provider).

The flowcharts and block diagrams in the accompanying drawings illustrate the possible implementation of the system architectures, functions, and operations of the system, method, and computer program product according to various embodiments of the disclosure. In this regard, each block in the flowcharts or block diagrams may represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown in succession may actually be executed substantially in parallel, and may sometimes be executed in the reverse order, depending on the functions involved. It should also be noted that each block in the block diagrams and/or flowcharts, and the combination of blocks in the block diagrams and/or flowcharts, may be implemented by a dedicated hardware-based system that performs the specified functions or operations, or may be implemented by a combination of dedicated hardware and computer instructions.

The modules or units involved in the embodiments described in the disclosure may be implemented in software or hardware. Wherein, the name of the module or unit does not constitute a limitation to the unit itself under certain circumstances. For example, a first data acquisition module may also be described as "a module for acquiring the first data."

The functions described hereinabove may be performed at least in part by one or more hardware logic components. For example, without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the context of the disclosure, a machine-readable medium may be a tangible medium, which may contain or store a program for use by or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above. More specific examples of machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In the apparatus provided in the embodiments of the disclosure, at least one of the multiple modules may be implemented through an AI model. The functions associated with AI may be performed by a non-volatile memory, a volatile memory, and a processor.

The processor may include one or more processors. At this time, the one or more processors may be a general-purpose processor (such as, center processing unit (CPU), application processor (AP)), or a pure graphic processing unit (such as, a graphic processing unit (GPU), a visual processing unit (VPU)), and/or an AI dedicated processor (such as, a neural processing unit (NPU)).

The one or more processor(s) control the processing of input data according to predefined operation rules or artificial intelligence (AI) model stored in non-volatile memory and volatile memory. The predefined operation rules or artificial intelligence models are provided through training or learning.

Here, "providing by learning" refers to obtaining predefined operation rules or AI models with desired characteristics by applying learning algorithms to multiple learning data. The learning may be performed in the apparatus in which the AI according to the embodiment is executed, and/or may be implemented by a separate server/system.

The AI model may consist of multiple neural network layers. Each layer has multiple weight values, and the calculation of one layer is performed by the calculation result of the previous layer and multiple weights of the current layer. Examples of neural networks include, but are not limited to, convolutional neural network (CNN), deep neural network (DNN), recurrent neural network (RNN), restricted Boltzmann machine (RBM), deep belief network (DBN), bidirectional loop deep neural network (bidirectional recurrent neural network, BRDNN), generative adversarial network (GAN), and deep Q network.

A learning algorithm is a method of training a predetermined target apparatus (for example, a robot) using a plurality of learning data to make, allow, or control the target apparatus to make determination or prediction. Examples of the learning algorithm include, but are not limited to, supervised learning, unsupervised learning, semi-supervised learning, or reinforcement learning.

Those skilled in the art may clearly understand that, for the convenience and conciseness of the description, the specific method implemented when the computer-readable medium described above is executed by an electronic device may refer to the corresponding process in the foregoing method embodiment, which will not be repeated herein.

It should be understood that although the various steps or operations in the flowchart of the drawings are displayed in sequence as indicated by the arrows, these steps are not necessarily performed in sequence in the order indicated by the arrows. Unless explicitly stated in the context, the execution of these steps is not strictly limited in order, and they may be executed in other orders. Moreover, at least part of the steps in the flowchart of the drawings may include multiple sub-steps or multiple stages. These sub-steps or stages are not necessarily executed at the same time, but can be executed at different times, and the order of execution is not necessarily performed sequentially, but may be performed in turn or alternately with at least a part of other steps or sub-steps or stages of other steps.

While the disclosure has been shown and described with reference to various embodiments thereof, it will be understood by those skilled in the art, that various changes in form and details may be made therein without departing from the spirit and scope of the disclosure as defined by the appended claims and their equivalents.

What is claimed is:

1. A method for determining a beam, the method comprising:
   determining at least one to-be-measured narrow beam among narrow beams corresponding to at least one wide beam based on spatial distribution information of the narrow beams, wherein the determining comprises selecting narrow beams that provide a largest region area coverage within a predefined spatial angle range;
   acquiring current received signal strength of reference signals transmitted through the at least one to-be-measured narrow beam and historical received signal strength data of the narrow beams previously selected within the predefined spatial angle range;
   determining a movement trajectory of a user equipment (UE) based on comparison between the current received signal strength and the historical received signal strength data; and
   predicting a target narrow beam for transmitting data by estimating a future position of the UE within the predefined spatial angle range based on the determined movement trajectory.

2. The method of claim 1, wherein the determining of the at least one to-be-measured narrow beam comprises:
   acquiring at least one candidate to-be-measured narrow beam corresponding to each of the at least one wide beam; and
   determining the at least one to-be-measured narrow beam among the at least one candidate to-be-measured narrow beam corresponding to each of the at least one wide beam, based on received signal strength of reference signals transmitted through the at least one wide beam.

3. The method of claim 2, wherein the acquiring of the at least one candidate to-be-measured narrow beam corresponding to each of the at least one wide beam comprises:
determining the at least one candidate to-be-measured narrow beam, based on spatial distribution information of narrow beams covered by each of the at least one wide beam.

4. The method of claim 3, wherein the determining of the at least one candidate to-be-measured narrow beam, based on spatial distribution information of narrow beams covered by each of the at least one wide beam, comprises:
determining at least one first narrow beam group including a first predefined number of narrow beams, among the narrow beams covered by each of the at least one wide beam;
acquiring a region area covered by each of the at least one first narrow beam group, based on the spatial distribution information of narrow beams in each of the at least one first narrow beam group; and
determining a first predefined number of narrow beams in a first narrow beam group which covers a largest region area, as the at least one candidate to-be-measured narrow beam.

5. The method of claim 2, wherein the acquiring of the at least one candidate to-be-measured narrow beam corresponding to each of the at least one wide beam comprises:
determining the at least one candidate to-be-measured narrow beam, based on usage rates of narrow beams covered by each of the at least one wide beam.

6. The method of claim 5, wherein the determining of the at least one candidate to-be-measured narrow beam, based on the usage rates of narrow beams covered by each of the at least one wide beam, comprises:
determining a first predefined number of narrow beams with a maximum usage rate among the narrow beams covered by each of the at least one wide beam, as the at least one candidate to-be-measured narrow beam.

7. The method of claim 6, wherein the acquiring of the usage rate of the narrow beams covered by each of the at least one wide beam comprises:
acquiring a number of time slots transmitted through the narrow beams covered by each of the at least one wide beam in a first specified period, and acquiring an average usage rate of the narrow beams based on the number of time slots;
acquiring a historical average usage rate of the narrow beams covered by each of the at least one wide beam; and
acquiring the usage rate of the narrow beams covered by each of the at least one wide beam, based on the average usage rate and the historical average usage rate.

8. The method of claim 2, wherein the determining of the at least one to-be-measured narrow beam among the at least one candidate to-be-measured narrow beam corresponding to each of the at least one wide beam, based on received signal strength of reference signals transmitted through the at least one wide beam, comprises:
determining candidate to-be-measured narrow beams covered by a second predefined number of wide beams with a largest received signal strength as the at least one to-be-measured narrow beam, or
determining the at least one to-be-measured narrow beam among candidate to-be-measured narrow beams covered by two wide beams with the largest received signal strength.

9. The method of claim 8, wherein the determining of the at least one to-be-measured narrow beam among candidate to-be-measured narrow beams covered by two wide beams with the largest received signal strength, comprises:
acquiring a first difference in received signal strength between the two wide beams with the largest received signal strength;
in response to the first difference being greater than or equal to a first predefined threshold, determining candidate to-be-measured narrow beams covered by a wide beam with a larger received signal strength among the two wide beams with the largest received signal strength, as the at least one to-be-measured narrow beam; and
in response to the first difference being less than the first predefined threshold, determining a third predefined number of to-be-measured narrow beams among the candidate to-be-measured narrow beams covered by the wide beam with the larger received signal strength, and determining a fourth predefined number of to-be-measured narrow beams among candidate to-be-measured narrow beams covered by a wide beam with a lower received signal strength, among the two wide beams with the largest received signal strength.

10. The method according to claim 9, wherein the determining of the third predefined number of to-be-measured narrow beams and the determining the fourth predefined number of to-be-measured narrow beams comprises:
determining at least one second narrow beam group among the candidate to-be-measured narrow beams covered by the wide beam with the larger received signal strength, wherein each of the at least one second narrow beam group includes the third predefined number of candidate to-be-measured narrow beams;
determining at least one third narrow beam group among the candidate to-be-measured narrow beams covered by the wide beam with the lower received signal strength, wherein each of the at least one third narrow beam group includes the fourth predefined number of candidate to-be-measured narrow beams; and
acquiring a second difference between a center direction of each of the at least one second narrow beam group and a center direction of each of the at least one third narrow beam group respectively, and determining candidate to-be-measured narrow beams in both the second narrow beam group and the third narrow beam group corresponding to a smallest second difference as the to-be-measured narrow beams.

11. The method of claim 10, wherein the acquiring of the second difference between the center direction of the second narrow beam group and the center direction of the third narrow beam group comprises:
acquiring a vertical direction angle and a horizontal direction angle of candidate to-be-measured narrow beams in both the second narrow beam group and the third narrow beam group; and
acquiring the second difference between the center direction of the second narrow beam group and the center direction of the third narrow beam group, based on the vertical direction angle and the horizontal direction angle of the candidate to-be-measured narrow beams.

12. The method of claim 10, wherein the third predefined number is equal to the fourth predefined number.

13. The method of claim 1, wherein the predicting of the target narrow beam for transmitting data based on the received signal strength comprises:
  predicting the target narrow beam for transmitting data by using a prediction model based on the received signal strength.

14. The method of claim 13,
  wherein the prediction model includes at least two prediction sub-models, the method further comprising:
    acquiring movement state information of a user equipment (UE), wherein the movement state information indicates movement speed of the UE; and
    determining a prediction sub-model for predicting the target narrow beam among at least two prediction sub-models of the prediction model, based on the movement state information, and
  wherein the predicting of the target narrow beam for transmitting data by using the prediction model based on the received signal strength comprises:
    predicting the target narrow beam for transmitting data by using the determined prediction sub-model based on the acquired received signal strength.

15. The method of claim 14, wherein in response to the determined prediction sub-model comprising at least two prediction sub-models, each of which corresponds to a prediction moment, the predicting of the target narrow beam for transmitting data by using the determined prediction sub-model based on the acquired received signal strength comprises:
  predicting the target narrow beam for corresponding prediction moment separately by using each of determined prediction sub-models, based on the acquired received signal strength.

16. The method of claim 14, wherein the acquiring of the movement state information of the UE comprises: acquiring a movement speed value of the UE or switching times of activated beam of the UE in a second specified period.

17. The method of claim 13, wherein the predicting of the target narrow beam for transmitting data by using the prediction model based on the received signal strength comprises:
  acquiring received signal strength of reference signals transmitted through the at least one wide beam;
  acquiring historical received signal strength of the at least one wide beam and historical received signal strength of the at least one to-be-measured narrow beam; and
  predicting the target narrow beam, by using the prediction model, based on the historical received signal strength of the at least one wide beam and the historical received signal strength of the at least one to-be-measured narrow beam, and the received signal strength of the at least one wide beam and the received signal strength of the at least one to-be-measured narrow beam.

18. A non-transitory computer readable storage medium, having stored thereon a computer program which, when executed by a processor, implements the method of claim 1.

* * * * *